(12) United States Patent
Toya

(10) Patent No.: US 8,519,907 B2
(45) Date of Patent: Aug. 27, 2013

(54) INTERFACE ADJUSTMENT SUPPORT SYSTEM

(75) Inventor: Kazuyoshi Toya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1329 days.

(21) Appl. No.: 11/453,920

(22) Filed: Jun. 16, 2006

(65) Prior Publication Data

US 2007/0222702 A1    Sep. 27, 2007

(30) Foreign Application Priority Data

Mar. 27, 2006  (JP) ................................. 2006-086657

(51) Int. Cl.
*G09G 5/00*    (2006.01)

(52) U.S. Cl.
USPC .............. 345/3.4; 709/223; 715/733

(58) Field of Classification Search
USPC ................. 714/6; 345/204, 1.1–3.4; 725/47, 725/135–142; 709/223–226, 246; 715/717–726, 733–736, 744–747
See application file for complete search history.

(56) References Cited

U.S. PATENT DOCUMENTS

| | | | | |
|---|---|---|---|---|
| 5,831,608 | A * | 11/1998 | Janay et al. ................... | 715/745 |
| 6,023,714 | A * | 2/2000 | Hill et al. ....................... | 715/235 |
| 6,081,265 | A * | 6/2000 | Nakayama et al. ............ | 715/746 |
| 6,396,511 | B1 * | 5/2002 | Karino .......................... | 715/744 |
| 2002/0118223 | A1 * | 8/2002 | Steichen et al. .............. | 345/745 |
| 2002/0147938 | A1 * | 10/2002 | Hamilton et al. ................. | 714/6 |

FOREIGN PATENT DOCUMENTS

| | | |
|---|---|---|
| CN | 1378133 | 11/2002 |
| CN | 1378133 A * | 11/2002 |
| CN | 1536821 A | 10/2004 |
| JP | 7-244568 | 9/1995 |
| JP | 11-306121 | 11/1999 |
| JP | 2001-34580 | 2/2001 |
| JP | 2001-306204 | 11/2001 |
| JP | 2002-7241 | 1/2002 |
| JP | 2003-76458 | 3/2003 |
| JP | 2004-056469 | 2/2004 |
| JP | 2004-185553 | 7/2004 |
| KR | 2003-0086311 | 11/2003 |
| WO | 02/082266 A2 | 10/2002 |
| WO | 02/082266 A3 | 10/2002 |

OTHER PUBLICATIONS

Office Action issued in corresponding Korean Patent Application No. 10-2006-0061158; mailed on Mar. 31, 2008.
Notice of Rejection for corresponding Japanese Patent Application No. 2006-086657, mailed on Dec. 14, 2010.
Office Action issued in corresponding Chinese Patent Application No. 200610105922.4; mailed on May 9, 2008.

* cited by examiner

*Primary Examiner* — Liliana Cerullo
(74) *Attorney, Agent, or Firm* — Staas & Halsey LLP

(57) ABSTRACT

An interface adjustment support system that adjusts a display environment of a first display device (standard device)'s user interface used by a user to adapt to a second display device (device used), via a network, inputs setting information of a customized user interface of the standard device, stores the display information thereof, and adapts setting values, optimized based on the stored setting information of the standard device, to the device used when using the device used, thereby providing interfaces that have the same operational feel to the user, regardless of the device and location.

20 Claims, 24 Drawing Sheets

— Prior Art —

— Prior Art —

RESULT OF DISPLAY
ADJUSTMENT BY USER

— Prior Aet —

— Prior Art —

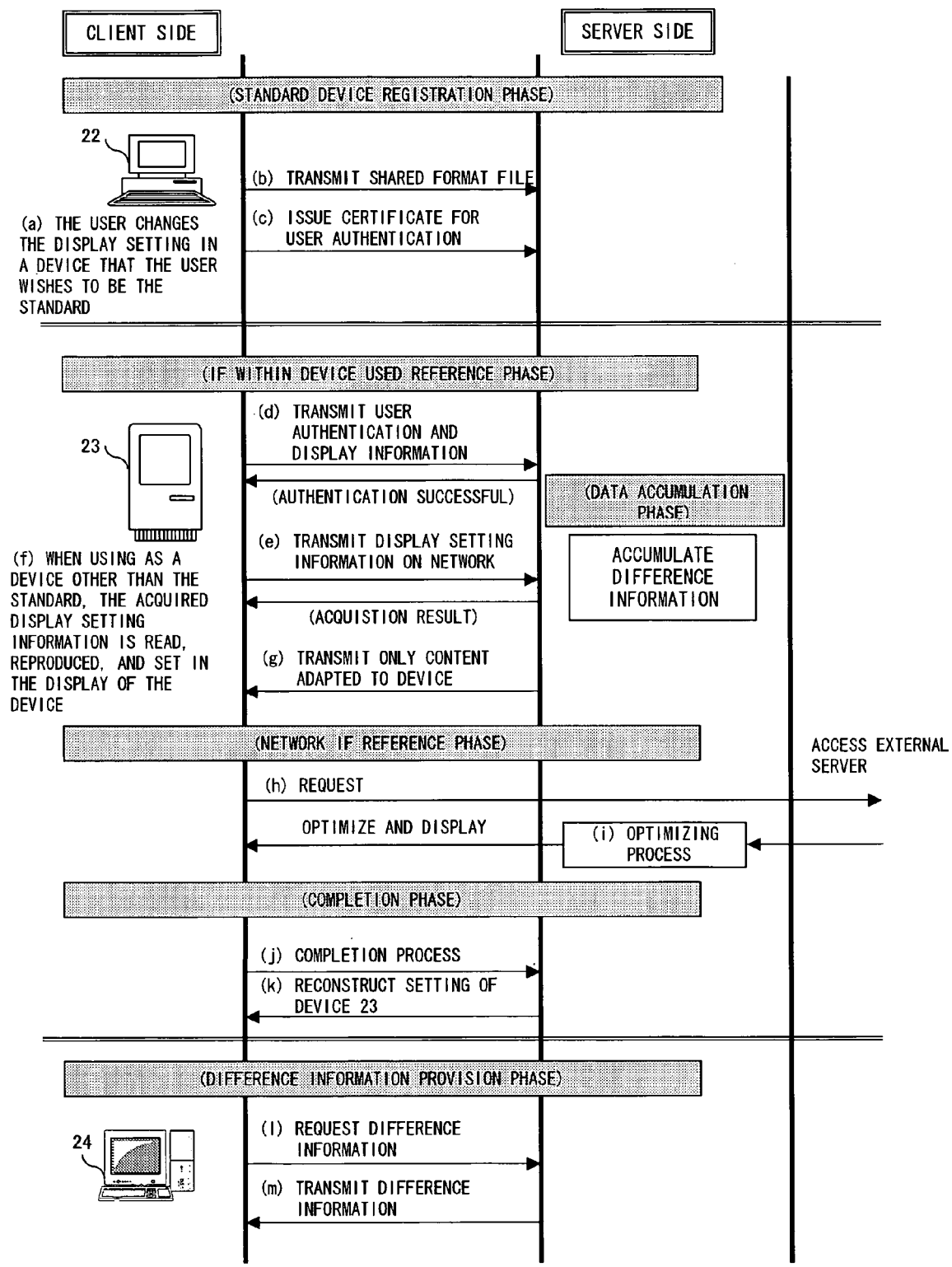
F I G. 7

```
[USER Setting]
USER_ID ,,,,,,, vihalsjazlxxlcmdmz ,
Serial ID ,,,,,,, og65413464158746341 ,
Language ,,,,,,, japanese,tokyo
sex ,,,,,,, m ,
Age group ,,,,,,, 30-35 ,
FileName ,,,,,,, Colors X 20051227 ,
[HardwareDisplayProperty]
MIN DPI Size ,,,,,,, 96 dpi,
MAX  DPI Size ,,,,,,, 160 dpi,
MIN Display resolution ,,,,,, 4:3-600-400,,
MAX Display resolution ,,,,,, 16:9-1600-900,,
MIN Font Dpi Percent Size ,,,,,,, 20% ,
MAX Font Dpi Percent Size ,,,,,,, 500% ,
Color characteristic ,,,,,,, RGB256 ,
[GUI Setting]
DPI Threshold of  length (Minus Percent) ,,,,,,,75%,
DPI Threshold of  length  (Plus Percent) ,,,,,,,75%,
DPI Threshold on side (Minus Percent) ,,,,,,,75%,
DPI Threshold on side (Plus Percent) ,,,,,,,75%,
ScreenRatio,,,,,,4:3-1024-768_120 dpi ,,
ActiveTitle,255,128,0,pt,,,
Background,0,128,0,pt,,,
Hilight,255,255,255,pt,,,
HilightText,255,128,0,10.5pt,,,
TitleText,255,255,255,9pt,,,
Window,255,191,128,10.5pt,,,
ScreenRatio,,,,,,4:3-1024-768,,
WindowText,0,0,0,10.5pt,,,
Scrollbar,255,191,128,10.5pt,,,
InactiveTitle,255,255,255,pt
Menu,255,128,0,pt
WindowFrame,0,0,0,pt
MenuText,0,0,0,10.5pt
ActiveBorder,255,128,0,pt
InactiveBorder,255,128,0,pt
AppWorkspace,170,85,0,pt
ButtonFace,255,128,0,pt
ButtonShadow,170,85,0,pt
GrayText,170,85,0,pt
ButtonText,255,255,255,10.5pt
InactiveTitleText,255,128,0,10.5pt
ButtonHilight,255,191,128,pt
ButtonDkShadow,0,0,0,pt
ButtonLight,255,128,0,pt
InfoText,0,0,0,pt
InfoWindow,255,255,225,10.5pt,,,,,
GradientActiveTitle,255,128,0,10.5pt,,,,,
GradientInactiveTitle,255,255,255,10.5pt,,,,,
ButtonAlternateFace,192,192,192,pt,,,,,
HotTrackingColor,0,0,128,pt,,,,,
MenuHilight,0,0,0,pt,,,,,
[Option]
network_proxy,,,,,,,proxykjhbdbd.com,8080,
Otherpassword ,,,,,,,, ,
e-mail Account001,,,,,,,cegwhgciw@.ne.jp,POP.com,SMTP.com
OnlineTool,,,,,,, google,
http://toolbar.google.com/intl/ja/index_ie.php,
                    .
                    .
                    .
```

FIG. 9

INTERFACE ADJUSTMENT SUPPORT SYSTEM

BACKGROUND OF THE INVENTION

1. Field of the Invention

The present invention relates to a system that provides a user interface to a device with a variable display function in a network environment.

2. Description of the Related Art

In recent years, use of a visualized user interface (hereinafter, the visualized interface is referred to as "interface" or "UI") has increased because a variety of people use client devices connected to a network.

In an environment such as this, if a user himself performs an arbitrary display adjustment to improve usability, the display often departs from the original intentions of the product creator, such as a manufacturer or a researcher. For example, a display according to the user's preference is performed in "an interface that is completed within the device being used" and in "an interface that is not completed within the device".

(User Interface when Completed Only within the Device)

"Interface that is completed within the device" indicates a user interface where the device can be used regardless of the existence of a connection with the network or coordination. In an "interface that is completed within the device", an interface that can be customized within a range intended by the product creator is provided.

In this case, as shown in FIG. 1, the uniformity of the interface operations is ensured, even when the user changes sizes and colors as desired and the device can be used without trouble. In addition, even when the product creator provides the interface in a plurality of patterns in advance, the interface is provided following the performance of sufficient tests, and thus, the device can be used without any operational trouble. Therefore, as long as the customization of the interface is completed within the device, the device can be used with almost no problems.

(User Interface when not Completed within the Device)

"Interface that is not completed within the device" indicates an embodiment in which the subject interface is on a network, and when using the interface the device accesses and uses the interface via the network (see FIG. 2).

In the "interface that is not completed within the device", countless product creators exist for each interface and the methods of expression are diverse. Therefore, when the user performs an arbitrary display adjustment of the display aspect of the device, a constant effect cannot regularly occur.

In addition, the interface design by the product creator must always be taken into consideration. Therefore, when the arbitrary display adjustment of the display aspect of the device is forcibly performed without taking into consideration the product creator's design, for example, situations could arises that will affect operation of the interface, including (1)layout disarray, (2) overlapping display contents, (3) character-string display disarray (in color setting, a color may become the same as that of another component, due to the color setting by the user), or (4) interface component hidden outside of the display region, can occur, as shown in FIG. 3.

(When the Device is Used in a Plurality of Locations)

In recent years, the user does not necessarily have to provide a device when using a network outdoors, and networks can be used with devices dispersed worldwide. Although an environment reaching the aim of ubiquitous computing, "anytime, anywhere", has not yet been actualized, an environment in which a network can be accessed from a plurality of locations is being realized.

In an environment such as this, each individual accessing the network from respective devices is identified through the use of pre-existing user authentications, biometrics, authentication methods using information that can only be known by the individual, etc.

Using the above tools, user authentication per se can be performed easily. However, it is difficult to configure the display aspect of the screen of all the respective devices to the same setting. Therefore, as in FIG. 4, when a single-specification device provided in a plurality of locations is used, problems such as the following can occur. First, reproduction of the same user interface environment at all times is not easy. In addition, when using the device, certain discomforts in regards to the display aspect due to differences in display size and the like occurs, thereby decreasing operability. Furthermore, productivity may decrease due to the enforcement of an interface that differs from the preferences of the individual. Additionally, when a certain color is given a special meaning in a color scheme configuration in a user interface environment that has been customized by the individual, this may lead to an oversight of a warning display or a delayed response in other user interface environments.

In the past, when changes to the display aspect of the user interface were possible, setting values such as the changed item, the display size, and the color specifications of the display aspect were stored only within the device. Therefore, numerous methods of improving usability and technical solutions have been proposed (for example, Japanese Laid-open Patent Publication 2001-306204 and Japanese Laid-open Publication 2004-56469).

However, when a conventional solution is actually used, differences can be felt in the operation between the user interface environment customized by the individual and the other interface environments. Furthermore, there is a risk that uniformity in the operability cannot be maintained due to a widening of the gap between operations caused by the differences.

SUMMARY OF THE INVENTION

In the present invention, an interface adjustment support system that can provide a user with interfaces with the same operational feeling, regardless of the device or location, is provided.

According to the present invention, an interface adjustment support system that adjusts a display environment of a user interface of a first display device to adapt to a second display device includes:

a first display setting information input unit to which first display setting information, the display setting information of the user interface of the first display device, is input;

a first display setting information storage unit that stores the first display setting information; and a display adapting unit that adapts the display environment of the first display device to the second display device based on the first display setting information.

According to the present invention, an information processing device includes:

a receiving unit that receives basic display setting information of a standard device from an interface adjustment support managing device; and a display adapting unit that adapts a display environment based on the basic display setting information.

According to the present invention, a storage medium that can be read by a computer includes:

a receiving process that receives a standard device's basic display setting information from a interface adjustment support managing device; and a display adapting process that adapts a display environment based on the basis display setting information.

According to the present invention, an interface adjustment support managing device that adjusts the display environment of a first display device's user interface to adapt to a second display device includes:

a first device display storage unit that stores first setting information that is the display setting information of the user interface of the first display device; and a difference information storage unit that compares second display setting information, that is the display setting information of a user interface of the second display device, and the first display setting information, and generates optimum display setting information from the comparison result, and stores change quantity of optimum setting information, based on the first display setting information, as difference information.

According to the present invention, a storage medium that can be read by a computer and stores an interface adjustment support managing program allowing the computer to execute a process that adjusts a display environment of a first display device's user interface to adapt to a second display device includes:

a first device display storage process that stores first display setting information that is the display setting information of the user interface of the first display device; and a difference information storage process that compares second display setting information, that is the display information of the second display device's user interface, and the first display setting information, and generates optimum display setting information from the comparison result, and stores change quantity of optimum setting information, based on the first display setting information, as difference information.

BRIEF DESCRIPTION OF THE DRAWINGS

FIG. 7 is a diagram showing a series of operations of an interface (IF) adjustment support system 20 according to the present embodiment;

FIG. 9 is a diagram showing an example of a shared format file according to the present embodiment;

DESCRIPTION OF THE PREFERRED EMBODIMENT

Figure 1:
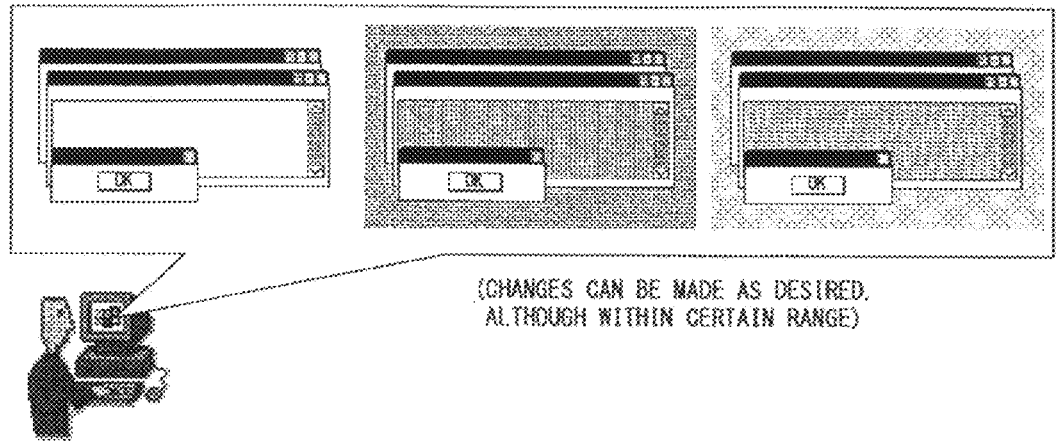
FIG. 1 is an example of a previous use of an interface that is completed within a device.
Figure 2:
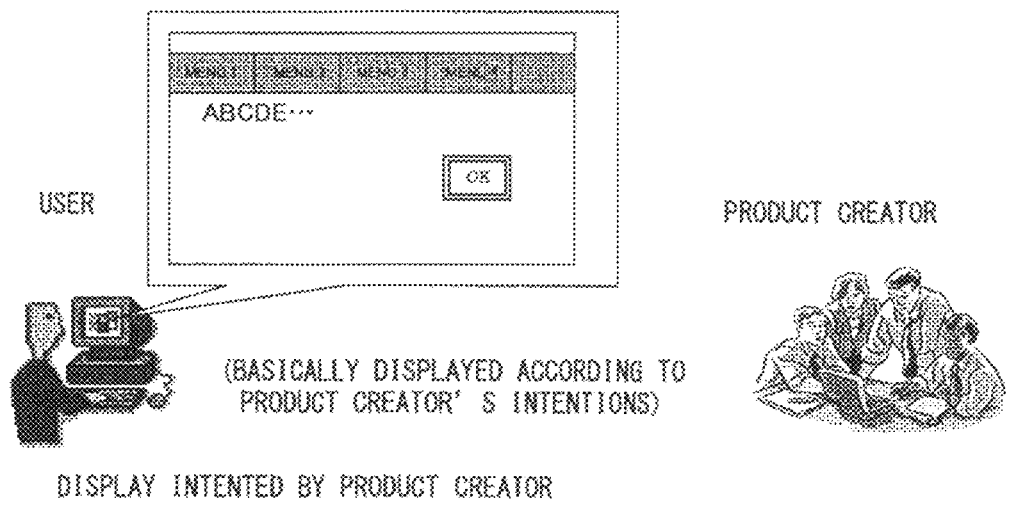
FIG. 2 is an example of a previous use of an interface that is not completed within a device (display intended by a product creator)
Figure 3:
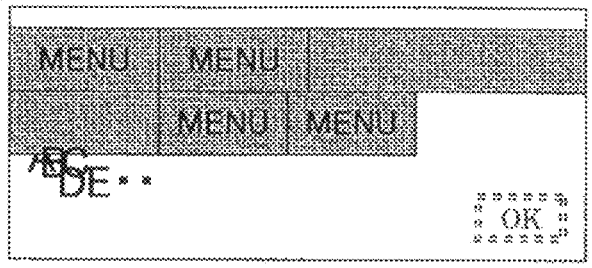
FIG. 3 is an example of a previous use of an interface that is not completed within a device (after display adjustments by a user)
Figure 4:
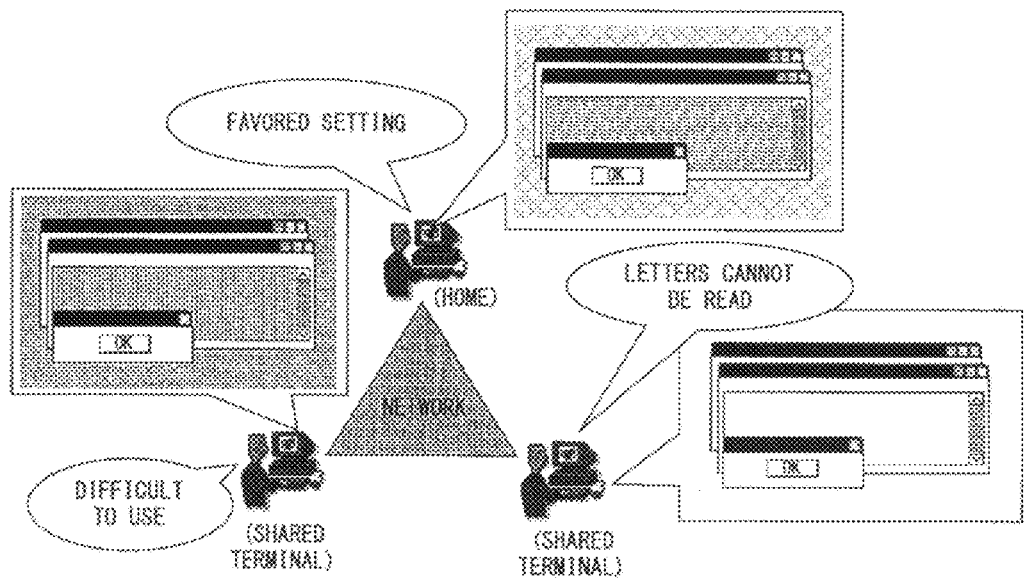
FIG. 4 is an example of a previous use wherein the display aspects differ for each device.
Figure 5:
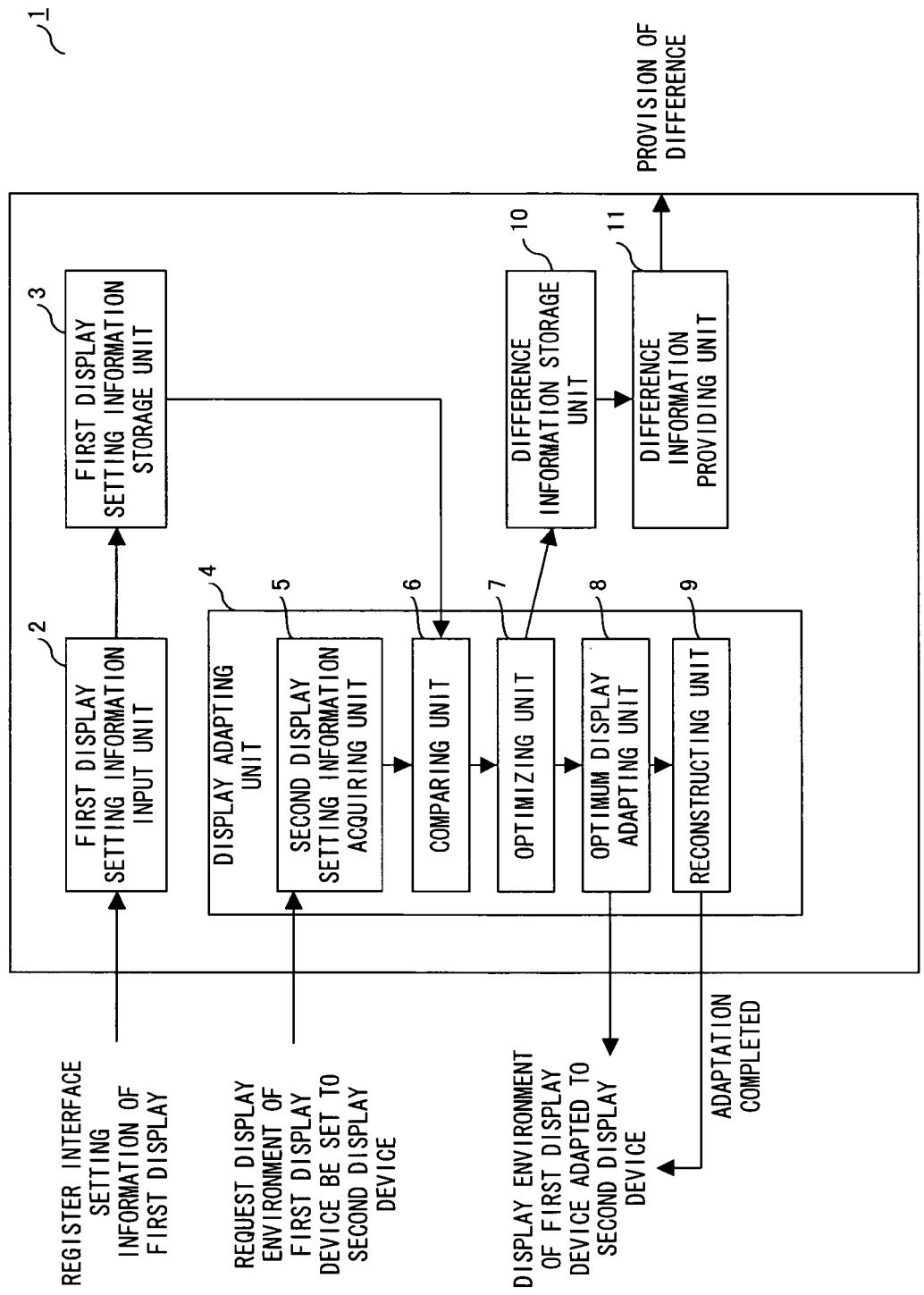
FIG. 5 is a conceptual diagram of an overall configuration of an interface adjustment support system according to the present invention.

FIG. 5 shows a conceptual diagram of an overall configuration of an interface adjustment support system of the present invention. Through the implementation of an interface adjustment support system 1, a user interface display environment of a first display device (corresponding to "standard device", described hereafter) can be adjusted and adapted to a second display device (corresponding to "device used", described hereafter).

The interface adjustment support system 1 is composed of a first display setting information input unit 2, a first display setting information storage unit 3, a display adapting unit 4, a difference information storage unit 10, and a difference information providing unit 11.

Display setting information (first display setting information) of the user interface of the first display device is inputted into the first display setting information input unit 2. The first display setting information storage unit 3 stores the first display setting information. The display adapting unit 4 adapts the display environment of the first display device to the second display device based on the first display setting information.

By using a configuration such as this, the user interface environment of the first display device can be adapted to the second display device.

The display adapting unit 4 is composed of a second display setting information acquiring unit 5, a comparing unit 6, an optimizing unit 7, an optimum display adapting unit 8, and a reconstructing unit 9. The second display setting information acquiring unit 5 acquires the display setting information (second display setting information) of the user interface of the second display device. The comparing unit 6 compares the first display setting information and the second display setting information.

The optimizing unit 7 generates optimum display setting information to be displayed in the second display device using the first display setting information and the second display setting information. The first and second display setting information is based on the comparison result from the comparing unit 6. In addition, the optimizing unit 7 can acquire the change quantity of the optimum setting information based on the first display setting information, as "difference information". Using a configuration such as this, the optimum information is adapted to the second display device and at the same time the difference information can be acquired.

The optimum display adapting unit 8 adapts the optimum display information acquired from the optimizing unit 7 to the second display device.

By using a configuration such as this, the first display device interface environment can be reproduced within the range of the specifications of the second display device.

The reconstructing unit 9 deletes the adapted optimum display setting information from the second display device and reconstructs the user interface of the second display device to the user interface before adaptation when the interface adjustment support system is completed after the optimum display setting information has been adapted to the second display device using the optimum display adapting unit 8.

By using a configuration such as this, the optimum display setting information is deleted when log-in into the system is terminated or when a forced shut-down occurs. The interface environment of the second display device before adaptation is reconstructed quickly. Thus, personal information can be protected.

The display optimizing unit 4 can optimize the optimum display setting information to the second display device when a user interface present within the second display device is referenced or when a user interface on a network is referenced.

By using a configuration such as this, the user interface of the first display device can be adapted to the second display device, not only when the user interface present within the second display device is referenced, but also when the user interface on the network is referenced.

The difference information storage unit 10 stores the difference information acquired by the optimizing unit 7. By using a configuration such as this, the difference information can be accumulated.

The difference information providing unit 11 provides the difference information stored in the difference information storage unit 10. In addition, the difference information providing unit 10 can perform statistical processing on the difference information and provide visualized difference information. The accumulated difference information can be provided to a product creator or the like. In addition, it facilitates the feedback of statistical information based on the difference information to a development-side. This also facilitates a further improved user interface.

Figure 6:
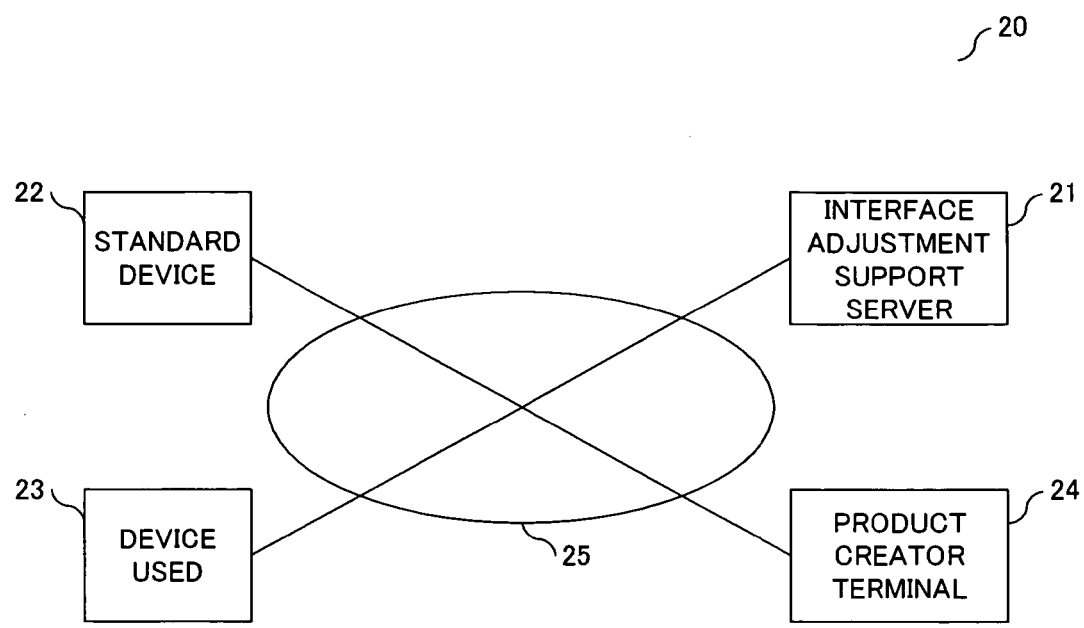
FIG. 6 is a diagram showing a network configuration of the interface adjustment support system according to the present embodiment.

FIG. 6 shows a network configuration of the interface adjustment support system according to the present embodiment. The interface adjustment support system 20 is composed of a standard device 22, a device used 23, a product creator terminal 24, and an interface adjustment support server 21, via a network 25.

The product creator terminal 24 indicates a terminal of the content or system provider-side on the network.

The standard device 22 is a unique device that, among the devices used by the user, is the standard device in the present embodiment. The standard device 22 is equivalent to, for example, a personal computer (PC) owned by the user. A display aspect (user interface) set in the standard device 22 is registered in the interface adjustment support server 21.

The interface adjustment support server 21 (referred to, hereinafter, as IF adjustment support server) stores setting information related to the interface set in the standard device 22 by the user. In addition, to allow the user to use the setting information related to the interface of the standard device in other devices (device used 23), the IF adjustment support server 21 provides the setting information to the device used 23. The IF adjustment support server can be composed of one or more server devices.

The device used 23 is a device that can adapt setting contents related to the interface of the standard device registered in the IF adjustment support server 21 in the present embodiment. In other words, in the present embodiment, the device used 23 refers to a predetermined device other than the standard device 22 among the devices used by the user.

When the setting contents of the standard device 22's user interface is reflected in the device used 23, if the device models differ, the user interface of the standard device cannot be reproduced completely in the device used 23. For example, if there are differences dependant on hardware, such as differences in resolutions and in component ratios of screens, the user interface of the standard device 22 cannot be reproduced completely.

Therefore, it is necessary to absorb as many of the differences as possible and reflect the setting contents of the standard device 22 in the device used 23. In the device used 23, a process for all eviating the differences is performed using the IF adjustment support server 21. The user interface environment of the standard device is also reproduced as much as possible. At this time, the information corrected to adapt the setting information of the user interface of the standard device 22 to the device used 23 is accumulated in the IF adjustment support server 21, as "the difference information".

In addition, the IF adjustment support server 21 can provide the accumulated difference information based on a request by the product creator terminal 24.

FIG. 7 shows a series of operations of the IF adjustment support system 20. The user can customize the interface of the standard device 22. The setting information of the user customized standard device 22 interface is registered in the IF adjustment support server 21. Then, when the device used 23 is used, the setting contents of the standard device 22 registered in the IF adjustment support server 21 can be adapted.

The foregoing will be explained with reference to FIG. 7. Predetermined software (referred to, hereinafter, as a setting information handling agent (setting information HA)) according to the present embodiment is respectively installed in the standard device 22 and the device used 23.

<Standard Device Registration Phase>

In a standard device registration phase, the user customized setting information related to the user interface is registered in the IF adjustment support server 21. In this phase, (a) to (c), below, are performed.

(a) First, the user changes the display setting of the user interface of the standard device 22. The changed setting contents of the interface are managed by the setting information HA within the standard device 22, using a shared format file, described hereafter.

(b) After the completion of the interface setting change, the user depresses a predetermined button on the standard device 22. Then, the setting information HA converts information including the setting contents (display setting information) of constituent elements of the display aspect of the interface (size of the display area, screen ratio, the number of colors, language set (language normally used by the user), positional information of a plug-in on the network, etc., required for display) into the shared format file format, in the present embodiment. It then transmits the shared format file to the IF adjustment support server 21.

(c) In addition to (b), above, the setting information HA issues a certificate for user authentication and transmits the certificate to the IF adjustment support server 21. Here, the original data of authentication (personal information such as user ID and password, the serial number of the setting information HA, etc.) for uniquely managing the user within the interface adjustment support system 20 is transmitted as attribute data of the standard device 22.

Figure 8:
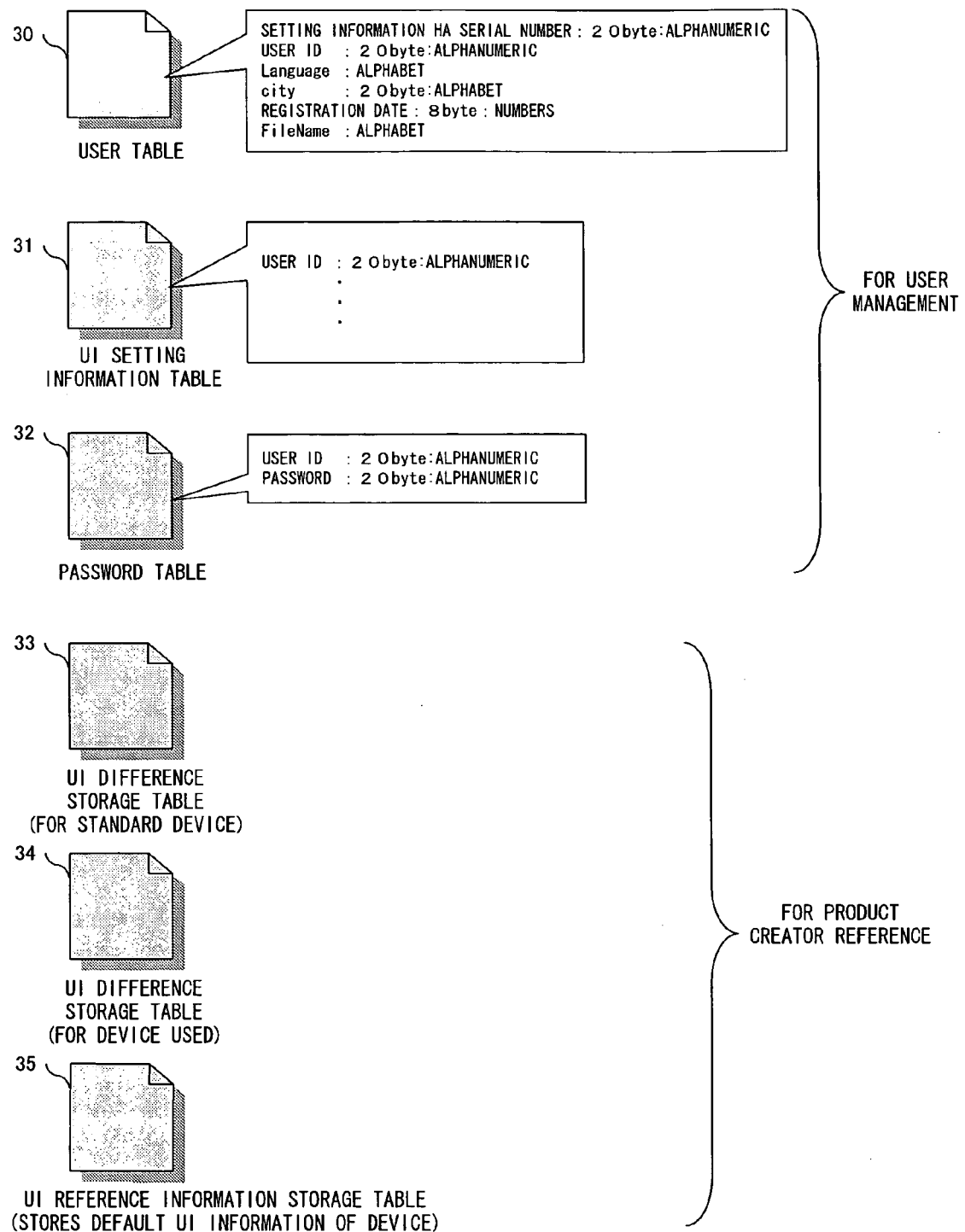
FIG. 8 is a diagram showing table groups stored in an IF adjustment support server 21 according to the present embodiment.

The IF adjustment support server 21 receives the user information and the interface setting information. Then, the IF adjustment support server 21 stores the interface setting information in a user interface (UI) setting information table 31. The user information is stored in a user table 30 and a password table 32, as shown in FIG. 8. The data stored in the tables are correlated and stored.

<IF Within Device Used Reference Phase>

The IF within device used reference phase is a phase where the interface of the standard device 22 is set to adapt to the device used 23. In this phase, (d) to (g), below, are performed.

(d) The user logs in to the IF adjustment system 20 using the device used 23. Then, the setting information HA transmits authentication information for authenticating the user and information on the device used 23 interface's current setting state to the IF adjustment support server 21 by the shared format file.

(e) After authentication by the IF adjustment support server 21, the device used 23 acquires the display setting information of the standard device 22 from the IF adjustment support server 21 (the shared format file is transmitted to the device used 23 from the IF adjustment support server 21).

(f) If the device used by the user is the device used 23, the acquired display setting information is set and displayed in the device used 23.

(g) However, in (f), if the display setting information cannot be reproduced in the display used 23, the transmitted display setting information is not changed and only the display setting information that can be reproduced in the device used 23 is adapted. In addition, the ID adjustment support server 21 accumulates the difference information indicating the setting information to which the original setting information was adapted, the degree of corrections made on the original setting information for adaptation, and the like.

When the display setting information registered in the IF adjustment support server 21 in the standard device registration phase is reproduced and used in the device used 23 in this way, the user accesses the device used 23 from a network. As a result, if the above-described (d) is successful, the above-described (e) and (f) are performed and the display environment of the standard device 22 can be reproduced in the device used 23. However, if the reproduction cannot be performed in the hardware environment of the device used 23, the display environment of the standard device 22 can be reproduced within an adaptable range as is detailed in the above-described (g).

The reproduction of the display environment of the standard device 22 regarding the interface environment within the device used is set in the IF within the device used reference phase. The reference of the interface on the network is explained in the next "network IF reference phase".

<Network IF Reference Phase>

In the network IF reference phase, the user interface environment set in the standard device is provided when an interface on a network is referenced. In this phase, (h) to (i), below, are performed.

(h) Using the device used 23 set in the above-described "IF within device used reference phase", the interfaces dispersed on the network are accessed. Then, the device used attempts to access the display setting of the reproduced interface environment of the standard device and requests the interface on the network, via the IF adjustment support server 21.

(i) In the IF adjustment support server 21, only the display aspect of the user interface is changed using an optimizing process, while the functions and display contents originally held by the user interface on the network are maintained and the request is returned to the user. In the device used 23, the network interface can be referenced in the optimized user interface environment. In addition, difference information indicating the setting information that adapted the original setting information, the degree of corrections made on the original setting information by the adaptation, and the like is accumulated in the IF adjustment support server 21.

<Completion Phase>

In the completion phase, when use of the device used is completed or the user logs out from the network, the setting contents adapted in the above-described <IF within device used reference phase> are completed, and the interface environment of the device used 23 is reconstructed to its original state before adaptation.

In other words, when the user logs into the network, the setting information of the device used 23 interface before log-in is saved in the background. Then, when use of the device used 23 is completed, the interface environment of the device used 23 is reconstructed based on the setting information of the device used, held in the background.

The completion phase is always performed at the completion of the IF support system 20. The phase can prevent leakage and loss of personal information by reconstructing the original interface stored within a client when the client cannot maintain coordination with the IF adjustment support server 21. In the completion phase, (j) to (k), below, are performed.

(j) The user logs out from the network. Alternatively, the connection with the network is severed.

(k) The interface environment of the device used 23 is reconstructed based on the setting information of the device used held in the background in advance.

<Data Accumulation Phase>

The data accumulation phase refers to a phase during which the difference information is accumulated in the IF adjustment support server 21, in the above-described "IF within device used reference phase" and "network IF reference phase".

<Difference Information Provision Phase>

In the difference information provision phase, the difference information accumulated in the IF adjustment support server 21 is provided to the product creator of the interface for each interface. In this phase, (1) to (M), below, are performed.

(1) The product creator terminal 24 requests thief adjustment support server 21 to provide accumulated difference information.

(m) The IF adjustment support server 21 transmits the difference information to the product creator terminal 24.

Here, for example, a statistical calculation is performed on the quantified difference information and the result thereof is visualized and presented as a graph or the like. This facilitates the understanding of the weaknesses of the interface and suggests improvements. Therefore, preference research, such as man-hour, time, the burden of testing placed on the product creator, equalization of operability, and color trends, is facilitated.

FIG. 8 shows table groups stored in the IF adjustment support server 21 according to the present embodiment. A table group for user management and a table group for product creator reference are in the IF adjustment support server 21. A user table 30, a UI setting information table 31, and a password table 32 are in the table for user management. A UI difference storage table (for the standard device) 33, a UI difference storage table (for the device used) 34, and a UI reference information storage table 35 are in the table group for product creator reference.

The user table 30 stores the user information transmitted in the above-described "standard device registration phase". The user table 30 is composed of the data items: "serial number of setting information HA (data length: 20 bytes; data type: alphanumeric)", "user ID (data length: 20 bytes; data type: alphanumeric)", "Language (data type: alphabet)", "city (data length: 20 bytes; data type: alphabet)", "registration date (data length: 8 bytes; data type: numbers)", and "file name (data type: alphabet)".

"Serial number" stores a serial number unique to the setting information HA. "User ID" stores an ID for uniquely recognizing the user. "Language" stores the name of the language used. "City" stores positional information on the network (for example, Tokyo). "Registration date" stores the date on which data related to the user ID was registered in the IF adjustment support server 21. "File name" stores a file name set by the user.

The UI setting information table stores the setting information of the standard device 22 interface, customized by the user, and transmitted in the above-described "standard device registration phase". Based on the setting information, the same interface environment as that of the standard device 22 can be reproduced in the device used 23.

The UI setting information table 31 is composed "user ID (data length: 20 bytes; data type: alphanumeric)" and other data items. Other data items are information related to the setting items of the user interface, shown in FIG. 9.

The password table 32 stores a password transmitted in the above-described"standard device registration phase". The password table 32 is composed of the data items: "user ID (data length: 20 bytes; data type: alphanumeric) " and "password (data length: 20 bytes; data type: alphanumeric)". "Password" stores a password corresponding to the user ID.

The UI reference information storage table 35 stores the setting information of the standard device 22's default user interface transmitted in the above-described "standard device registration phase" and the default setting information of the device used transmitted in the above-described "IF within device used reference phase".

The UI difference storage table (for the standard device) 33 stores difference information on setting values acquired from the UI setting table 31 and the UI reference information storage table 35.

The UI difference storage table (for the device used) 34 stores the setting items actually adapted and the difference information as explained in the above-described "data accumulation phase". In other words, the setting item names of the standard device 22's setting information that are actually adapted to the device used, and the difference information indicating the degree of corrections made to the standard device 22's setting information to adapt to the device used and the like are stored.

The UI setting information table 31, the password table 32, the UI difference storage table (for the standard device) 33, the UI difference storage table 34, and the UI reference information storage table 35 are correlated to the user table 30.

FIG. 9 shows an example of a shared format file according to the present embodiment. The diagram shows an example in which subject data stored in the UI setting information table 31, the UI difference storage table (for the standard device) 33, the UI difference storage table (for device used) 34, and the UI reference information storage table 35 is transmitted from a client to the server-end by the shared format file, as shown in the diagram. As a type of shared format file, there is, for example, a comma separated values (CVS) type.

The shared format file stores information, such as the setting information name, R, G, B, font size, character embellishment, setting value within the screen (dot), screen ratio, option 1, and option 2.

As shown in FIG. 9, the IF adjustment support server 21 stores user information ([USER Setting]), display information ([Hardware Display Property]), graphical user interface (GUI) setting information ([GUI Setting]), and similar items transmitted from the standard device 22 (although the latter half of the setting information is omitted due to space constraints in the diagram, in actuality, all GUI setting information provided in the standard device 22 are covered).

Next, the process flow of each above-described phase will be explained.

Figure 10:
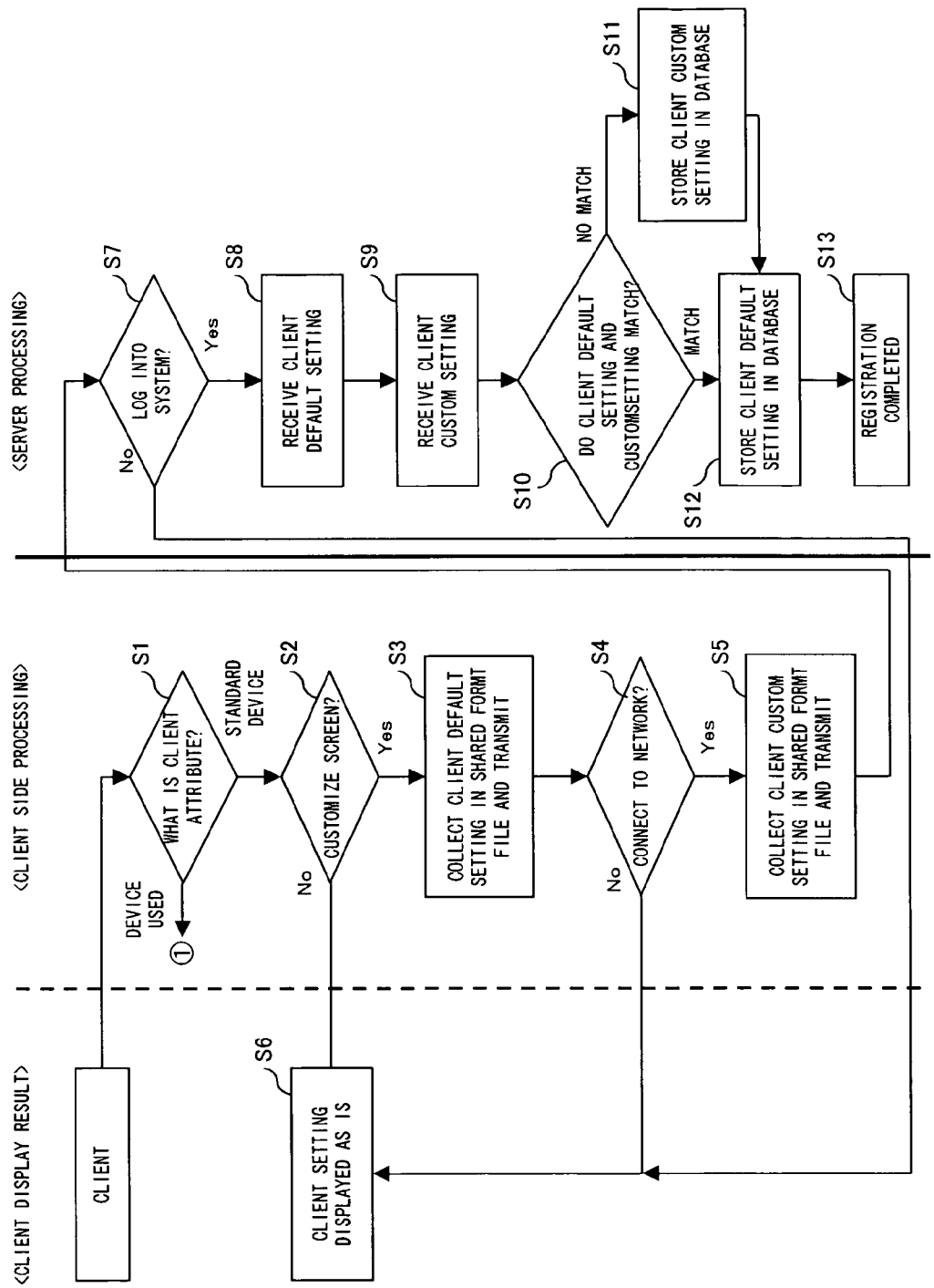
FIG. 10 is a diagram showing a process flow of a <standard device registration phase> according to the present embodiment.

FIG. 10 is the process flow of the <standard device registration phase> according to the present embodiment. For a client who installs the setting information HA, the user customizes the client's user interface and sets the user interface's setting in the client (the standard device 22). Then, the setting information HA performs the following processes with the IF adjustment support server 21.

First, the setting information HA judges the client attribute (Step 1. "Step" is hereinafter referred to as "S"). Here, because the stage is that wherein the standard device 22 is registered to the IF adjustment support server 21, the user specifies that the device being used is set as the standard device. Therefore, the client attribute becomes the standard device. In addition, if the device used is already registered as the standard device and the setting contents are updated, the client already has the shared format file, as described hereafter. In this case, the setting information HA can retrieve the file to judge if the client attribute is the standard device.

When it is judged that the client attribute is the standard device, the process S2 is performed. When it is judged that the client attribute is not the "standard device" (in other words, when it is the device used), the process proceeds to S23 in FIG. 11A.

Next, it is judged (S2) if the user interface of the client is customized. When it is judged that the user interface is not customized, the user interface is displayed as the user interface setting of the client. In other words, special processes are not performed and the user interface is displayed as usual.

When it is judged that the user interface is customized, the default setting information of the client's user interface is collected in the shared format file (referred to, hereinafter, as "standard device UI default setting information") and transmitted to the IF adjustment support server 21 (S3). At this time, the user authentication information, such as user ID and password, are also stored in the shared format file and are transmitted (refer to FIG. 9).

When the transmission processing at S3 cannot be performed (namely, if it is not connected to the network), the user interface is displayed as the client's user interface setting (S6). When the transmission processing at S3 can be performed (namely, it is connected to the network), the setting information of the client's user interface customized by the user is further stored in the shared format file (referred to, hereinafter, as "standard device UI custom setting information") and transmitted to the IF adjustment support server 21 (S5). Furthermore, it performs a log-in from the client to the IF adjustment support system 20.

When log-in from the client is performed (S7), the IF adjustment support server 21 receives the standard device UI default setting information and the standard device UI custom setting information transmitted at S3 and S5 (S8 and S9).

The IF adjustment support server 21 determines if the content of the standard device UI default setting information and the standard device UI custom setting information received at S8 and S9 completely match (S10). If the content of the standard device UI default setting information and the standard device UI custom setting information are judged to match at S10, the process at S12 is performed.

If the content of the standard device UI default setting information and the standard device UI custom setting information described above are judged not to match at S10, the IF adjustment support server 21 stores the standard device UI custom setting information in a database (S11). In other words, the UI setting information table 31 stores the standard device UI custom setting information.

Next, the client's default setting (standard device UI default setting information) is stored in the database (S12). In other words, the UI reference information storage table 35 stores the standard device UI default setting information. Furthermore, the UI difference storage table (for the standard device) 33 stores the difference information of the UI setting information table 31 and the UI reference information storage table 35.

In addition, the user table 30 and the password table 32 respectively store the user ID and the like and the password and the like. In this way, the registration of the standard device to the IF adjustment support server 21 is completed (S13).

FIGS. 11A to FIG. 11I show the process flows of the <IF within device used phase> according to the present embodiment. When the user uses the client, first, it is judged what the client attribute is (S21). As explained in S1 in FIG. 10, when it is judged that the client is the standard device, the process flow of the standard device registration phase in FIG. 10 is performed (S22).

When it is judged that the client attribute is the device used, an attempt is made to connect to the network (S23). When the connection to the network cannot be made, the settings of the client are displayed as is, as in S6 in FIG. 10 (S27).

When connection to the network can be made, the client temporarily stores the default setting of the interface of the client's initial setting and the setting information of the client's current interface (S24). Furthermore, log-in is performed from the client to the IF adjustment support system 20.

Figure 13:
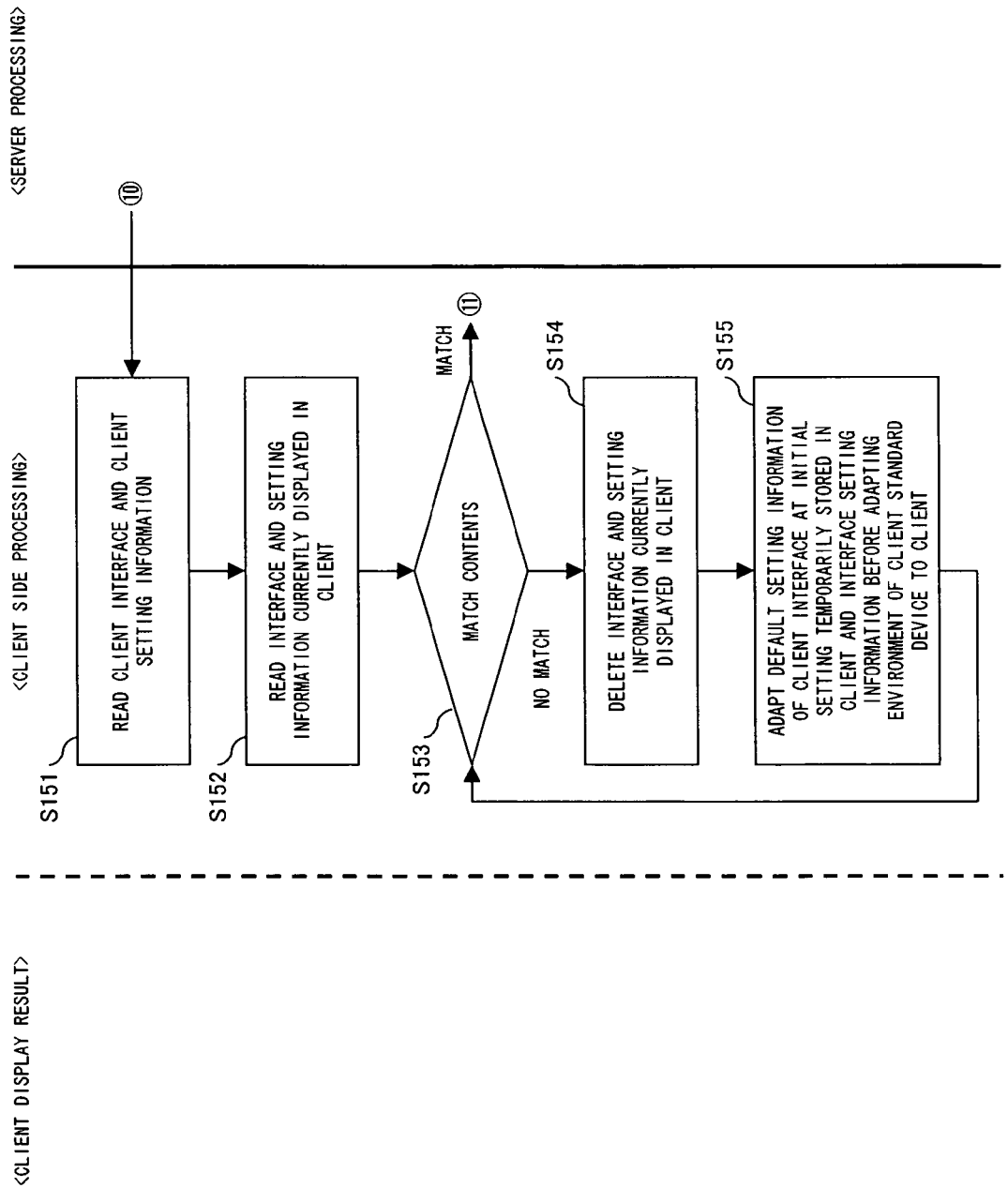
FIG. 13 is a diagram showing a process flow of a <completion phase> according to the present embodiment.

When log-in is performed from the client (S28), the IF adjustment support server 21 determines whether the client has the shared format file (S26). If log-in is not performed, the flow in FIG. 13 is performed.

Figure 11A:
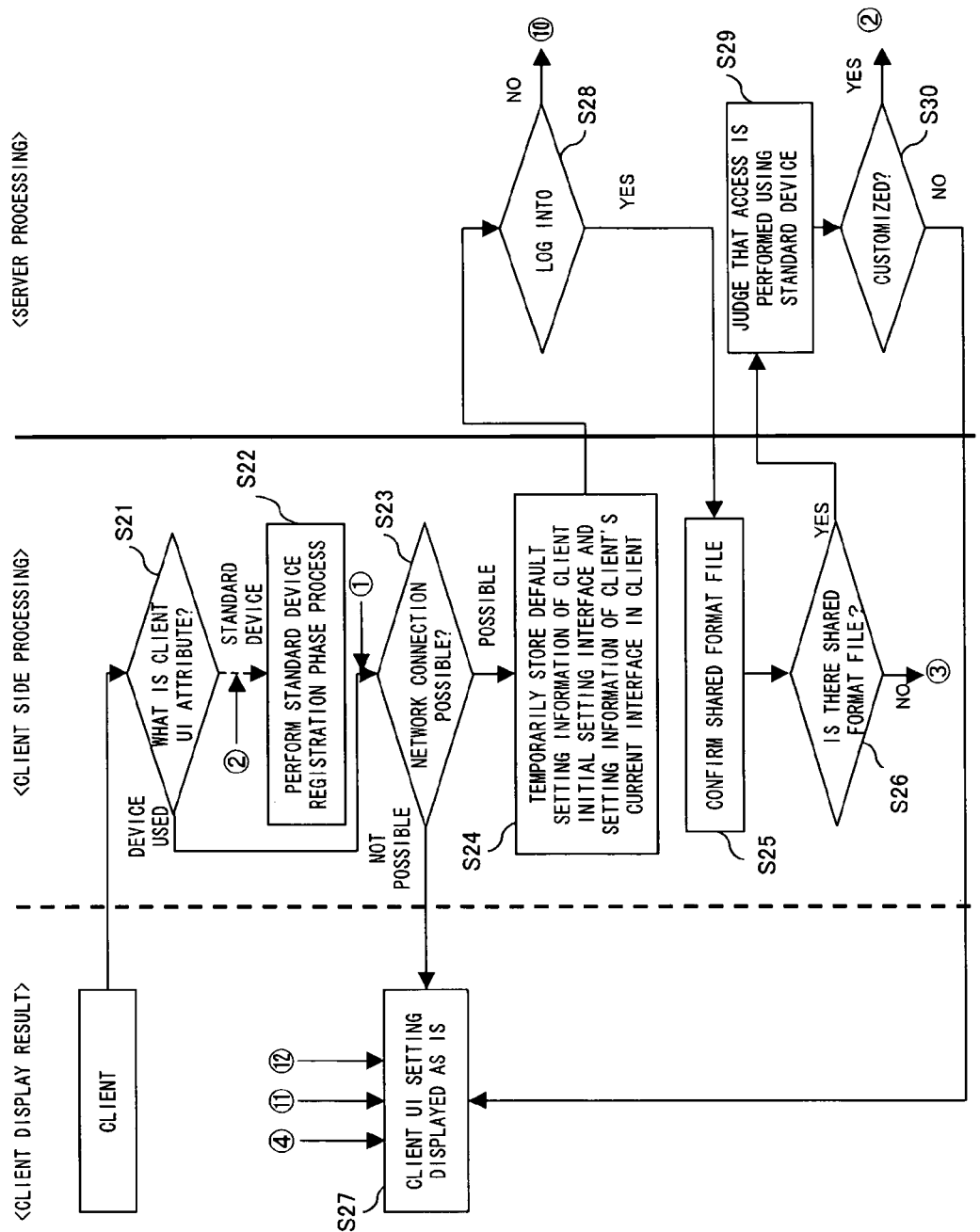
FIG. 11A is a diagram showing a process flow (1) of an <IF within device used reference phase> according to the present embodiment.
Figure 11B:
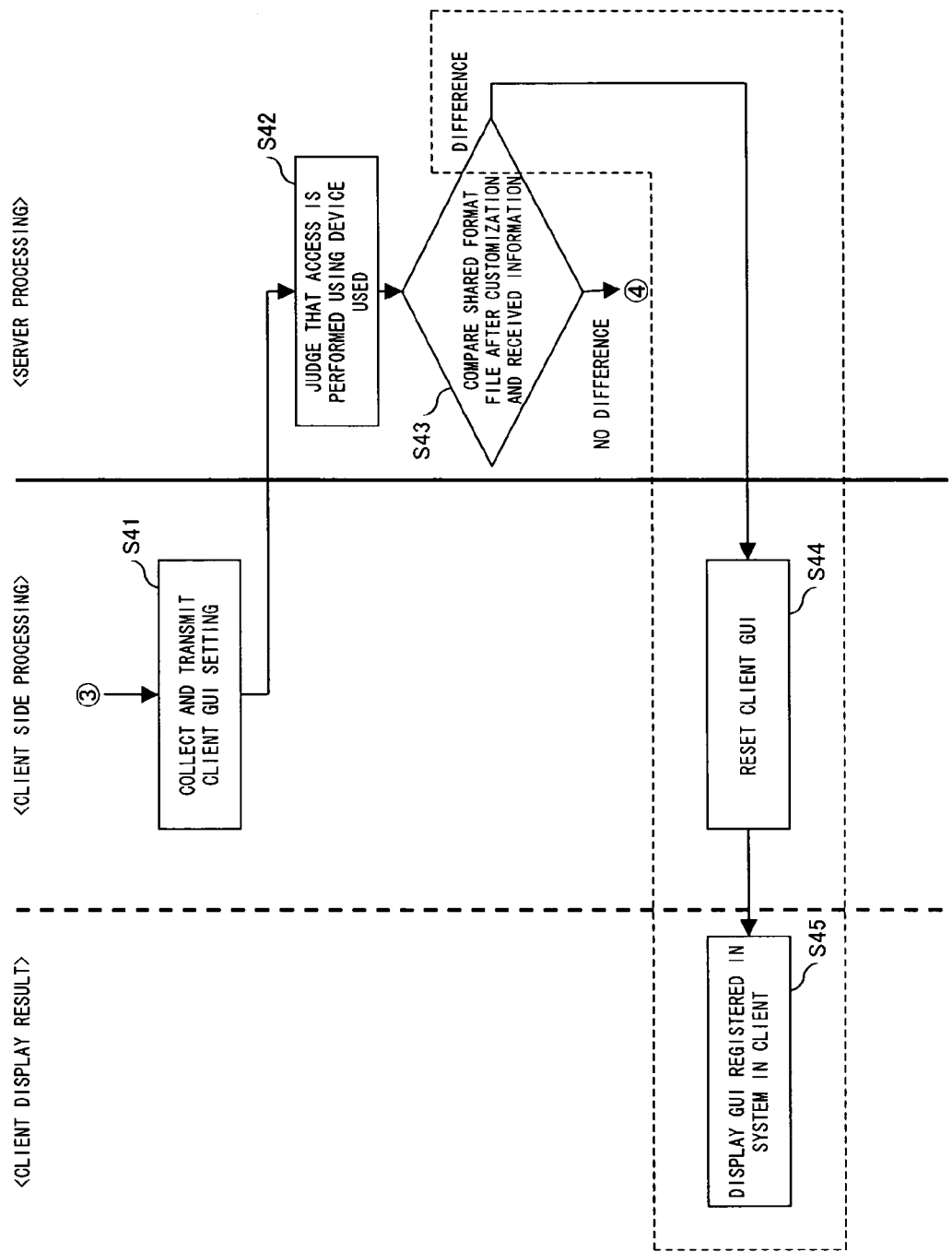
FIG. 11B is a diagram showing a process flow (2) of an <IF within device used reference phase> according to the present embodiment.

When there is no shared format file, the process proceeds to S41 in FIG. 11B. When there is the shared format file, the IF adjustment support server 21 judges if the client that has logged in is the standard device (S29).

Furthermore, the IF adjustment support server 21 judges if the client's interface is customized (S30). If the client's interface is not customized, the client's user interface setting is displayed as is (S27). If the client's user interface is customized (for example, when there already is the standard device UI custom setting information), the process flow of the standard device registration phase in FIG. 10 is performed (S22).

If there is no shared format file at S26, the setting (device used setting information) information of the client's GUI is collected and transmitted to the IF adjustment support server 21 (S41). In the IF adjustment support server 21 that received the device used setting information, the setting information HA's serial number included in the device used setting information differs from the serial number corresponding to the user ID stored in the UI setting information table 31. Thus, the IF adjustment support server 21 judges if the user is accessing using the device used (S42).

The IF adjustment support server 21 compares the shared format file after customization (standard device UI custom setting information), stored at S81, and the information received at S41 (S43).

Figure 11C:
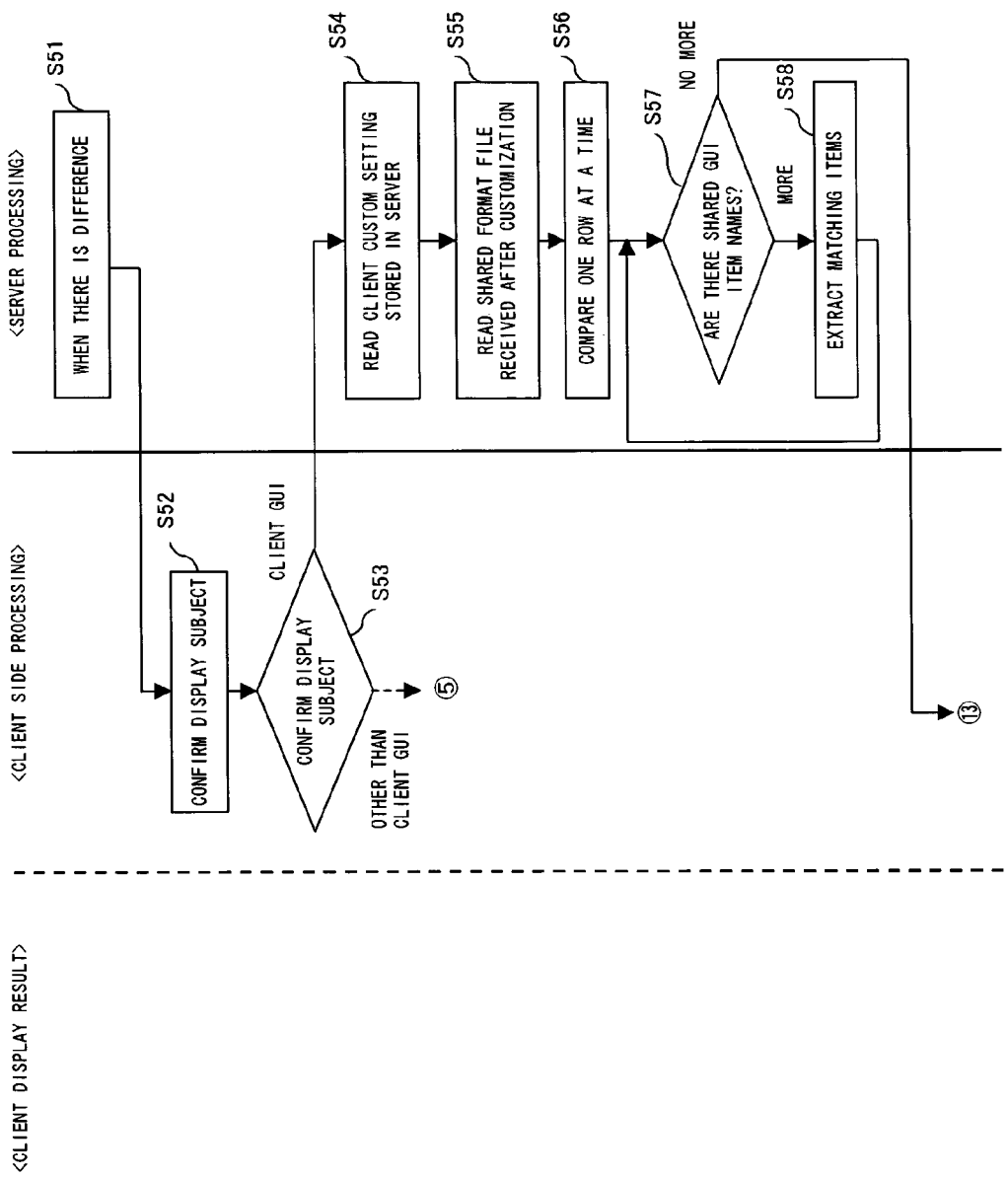
FIG. 11C is a diagram showing a process flow (3) of an <IF within device used reference phase> according to the present embodiment.
Figure 11D:
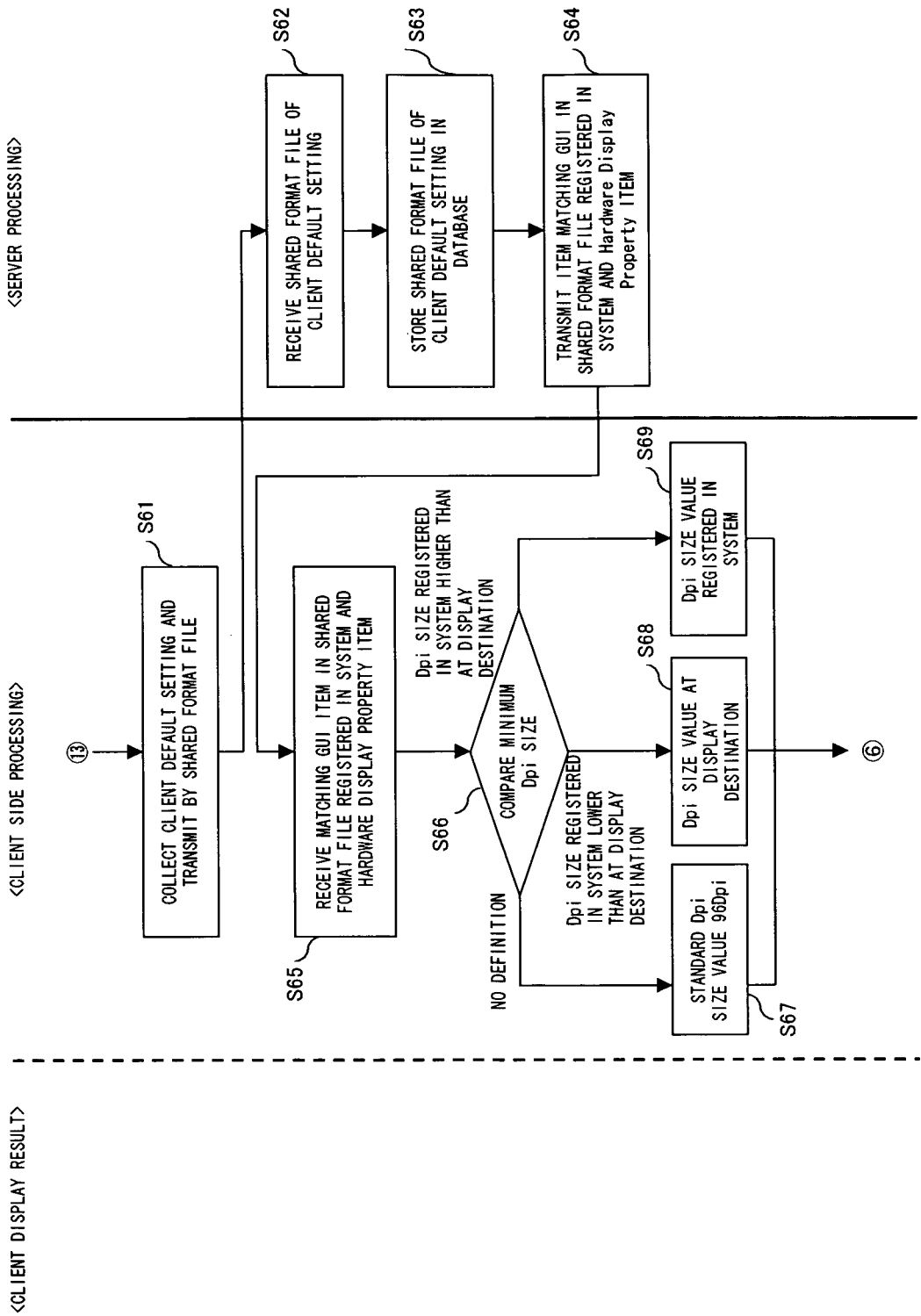
FIG. 11D is a diagram showing a process flow (4) of an <IF within device used reference phase> according to the present embodiment.
Figure 11E:
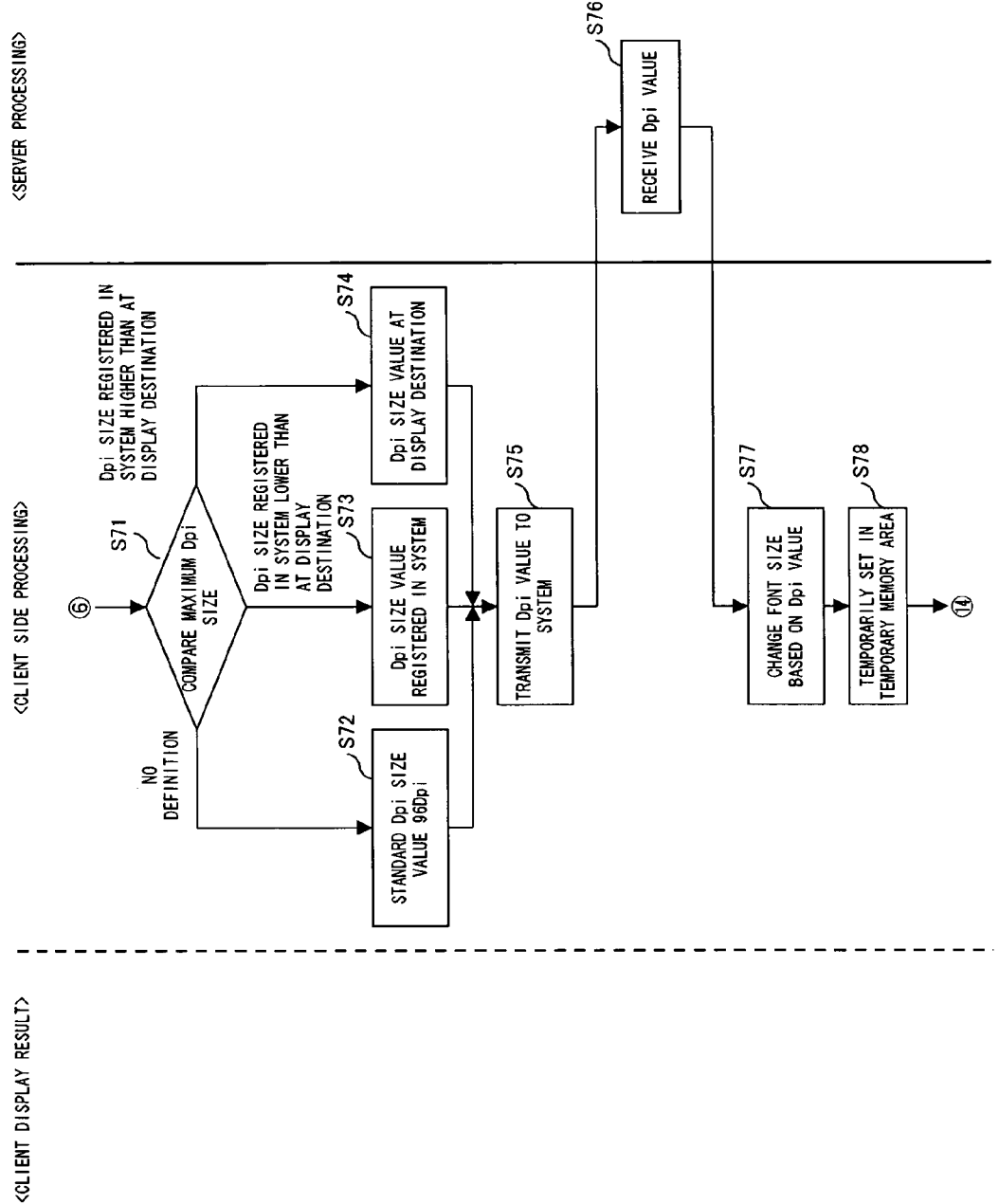
FIG. 11E is a diagram showing a process flow (5) of an <IF within device used reference phase> according to the present embodiment.
Figure 11F:
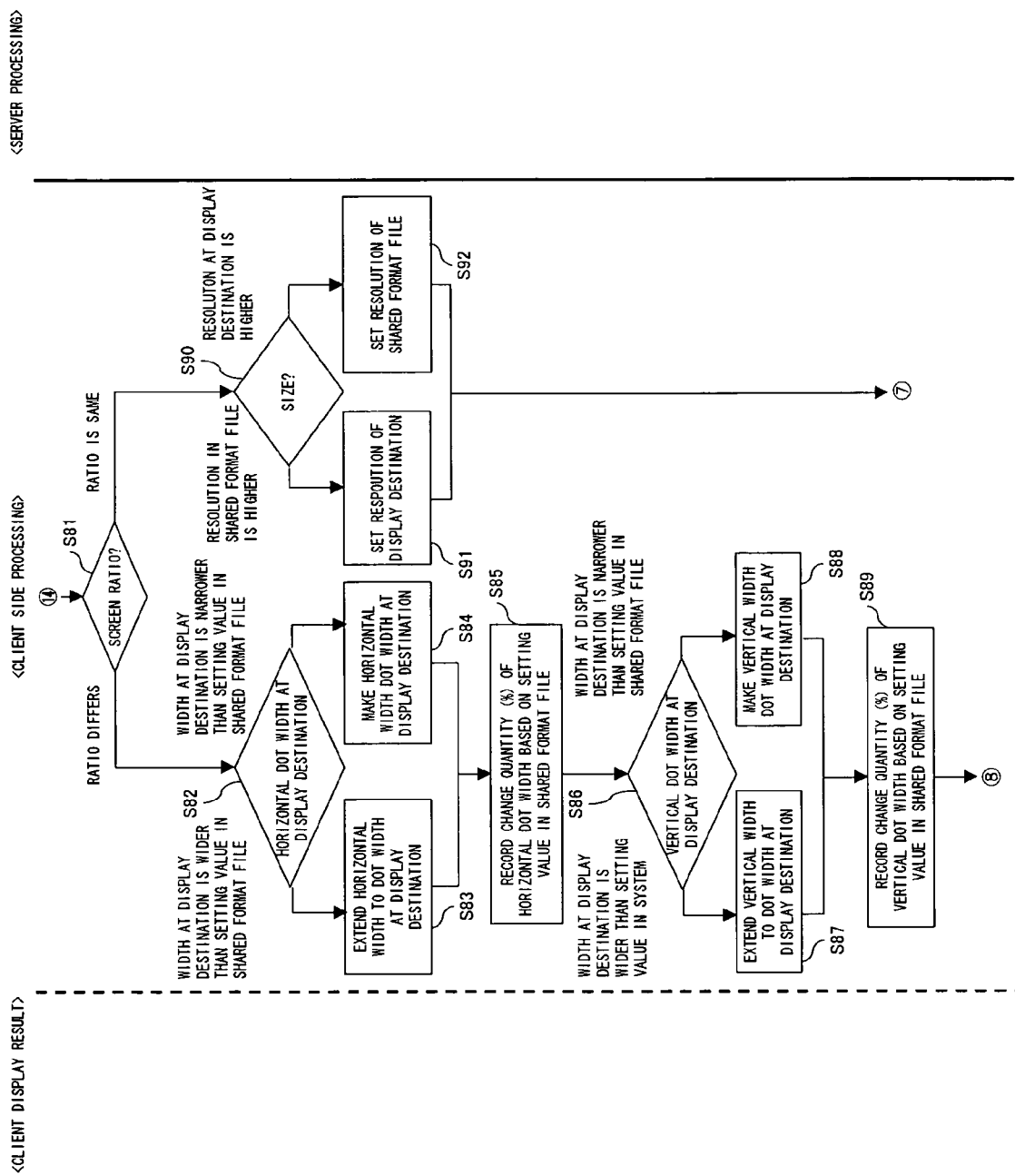
FIG. 11F is a diagram showing a process flow (6) of an <IF with in device used reference phase> according to the present embodiment.
Figure 11G:
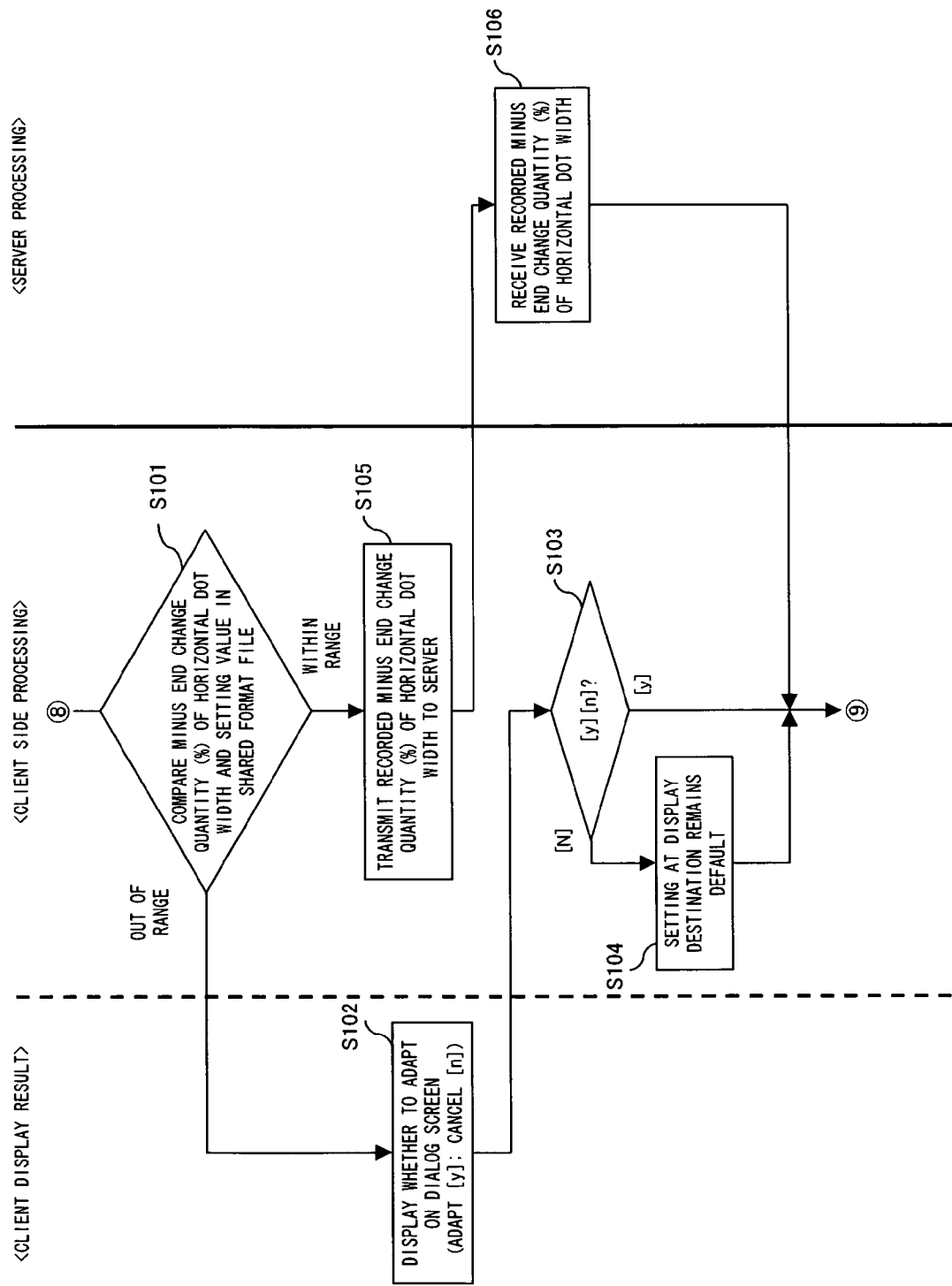
FIG. 11G is a diagram showing a process flow (7) of an <IF within device used reference phase> according to the present embodiment.
Figure 11H:
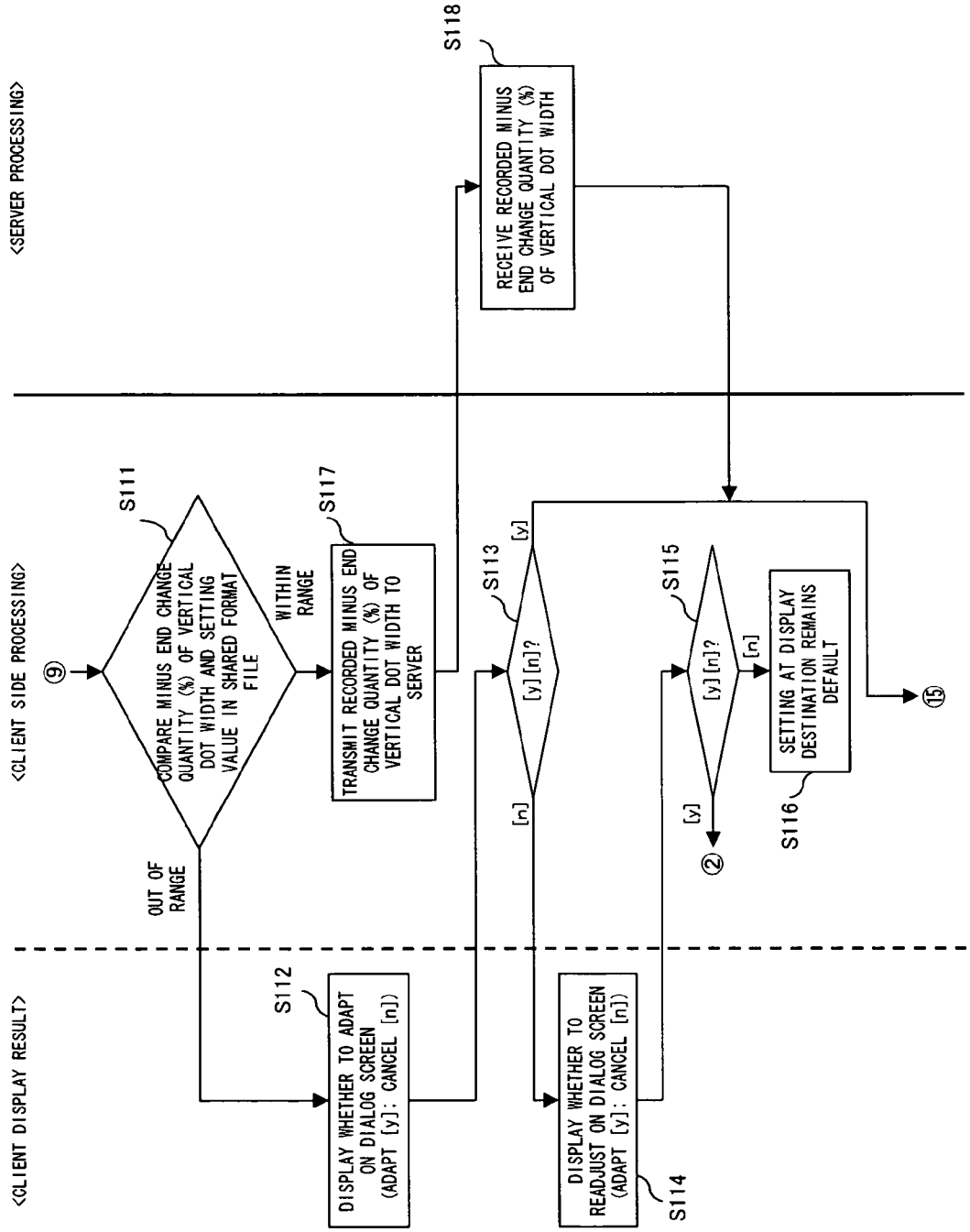
FIG. 11H is a diagram showing a process flow (8) of an <IF with in device used reference phase> according to the present embodiment.
Figure 11I:
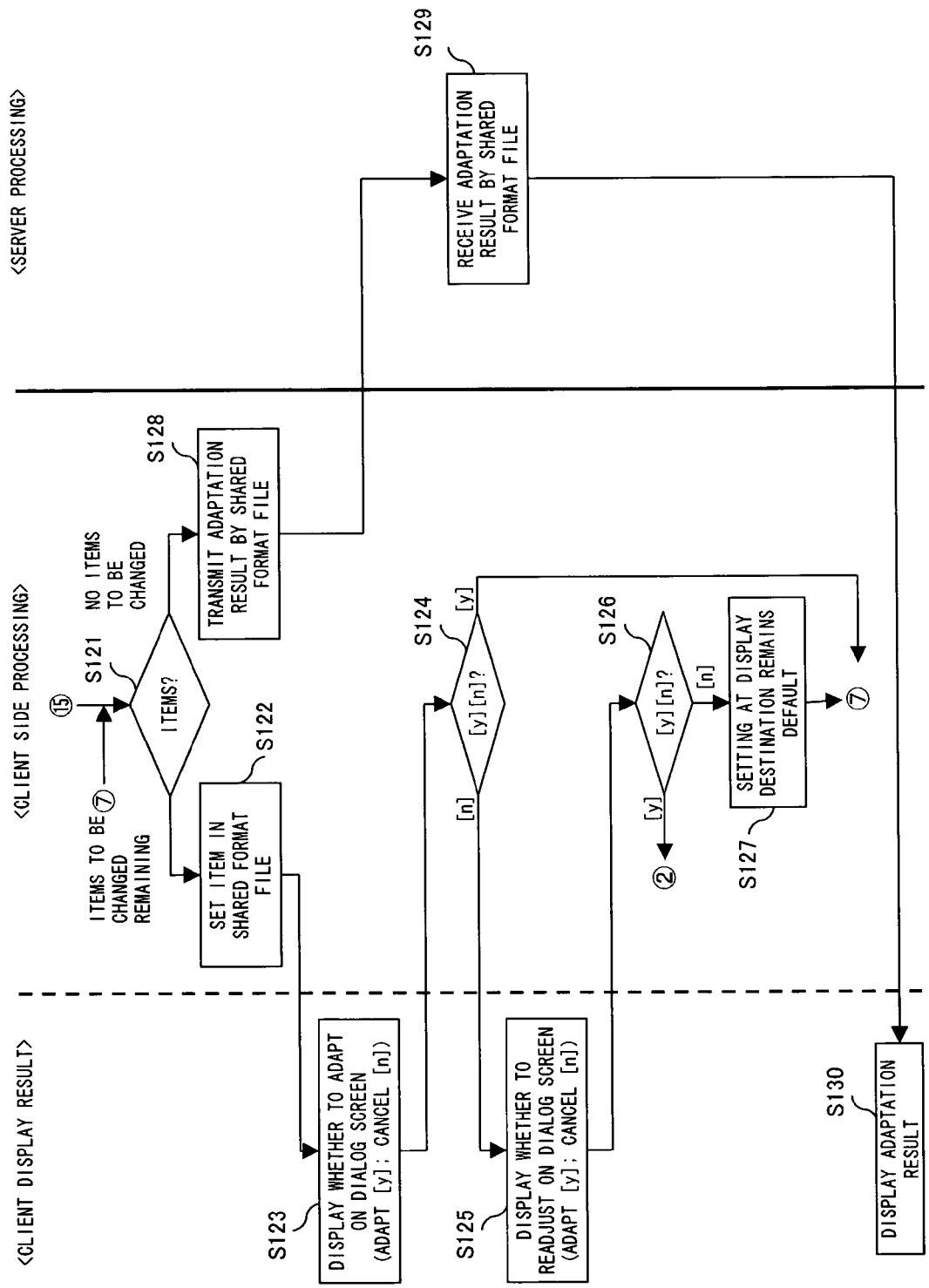
FIG. 11I is a diagram showing a process flow (9) of an <IF within device used reference phase> according to the present embodiment.

When there are no differences in the contents compared at S43, the client's user interface setting is displayed as is (S27). If there are differences in the contents compared at S43, and processing after FIG. 11C is performed, and the GUI environment registered in the IF adjustment support server 21 is reproduced in the client side (the device used 23) (S45).

It is explain in the case there are no differences in the contents compared at S43 as follows. When it was judged that there is a difference in S43, the setting information HA confirms the display subject (S52). If the display subject is other than the client's GUI (for example, when a predetermined user interface on the network is displayed) (S53), the process proceeds to S141 in FIG. 12.

In addition, when the display subject is the client's GUI (for example, when a predetermined user interface within the client is displayed) (S53), the IF adjustment support server 21 reads the device used setting information received at S42 (S54). Furthermore, the IF adjustment support server 21 reads the standard device UI custom setting information stored in the UI setting information table 31 (S55).

The IF adjustment support server 21 compares the device used setting information and the standard device UI custom setting information read at S54 and S55 one row at a time (S56). The comparison judges whether there are common GUI item names (for example an item in [GUI Setting] in FIG. 9 (S57). The matching items are extracted (S58). When the comparison of all GUI items is completed, the process proceeds to the process at S61 in FIG. 11D.

The setting information HA collects the default setting of the client's GUI, stores the collected setting in the shared format file, and transmits the file to the IF adjustment support server 21 (S61). The IF adjustment support server 21 receives the shared format file (S62) and then stores the file in the database (UI reference information storage table 35) (S63).

The IF adjustment support server 21 transmits the GUI's shared item information matched at S58 in FIG. 11C and the data item [Hardware Display Property] within the shared format file stored at S63 to the client (S64). The client then receives the transmitted information (S65).

The setting information HA first compares minimum dots per inch (Dpi) size "MIN DPI Size", based on the received information (the GUI shared item information received at S58 and the data item [Hardware Display Property] within the shared format file stored at S63 (refer to FIG. 9)). Dpi indicates how many dots express the length of one inch and indicates the dot density of the display device.

If the minimum Dpi is not defined in the received information at S66, namely, there is no "MIN DPI Size" in the [Hardware Display Property] (refer to FIG. 9), a standard Dpi size value is set at 96 Dpi (S67).

If the Dpi size value registered in the IF adjustment support server 21 is lower than that of the display destination at S66, the Dpi size value is set to the display destination's size value (S68).

If the Dpi size value registered in the IF adjustment support server 21 is higher than that of the display destination at S66, the Dpi size value is set to the size value registered in the IF adjustment support server 21 (S69).

Next, the setting information HA compares the maximum Dpi size "MAX DPI Size" based on the information received at S65 (S71).

If the maximum Dpi is not defined in the received information at S71, namely, there is no "MAX DPI Size" in the [Hardware Display Property], the standard Dpi size value is set at 96 Dpi (S72).

If the Dpi size value registered in the IF adjustment support server 21 is lower than that of the display destination at S71, the Dpi size value is set to the size value registered in the IF adjustment support server 21 (S73).

If the Dpi size value registered in the IF adjustment support server 21 is higher than that of the display destination at S71, the Dpi size value is set to the size value of the display destination (S74).

The setting information HA transmits the minimum Dpi value and the maximum Dpi value set at S67 to S69 and S72 to S74 to the IF adjustment support server 21 (S75). The IF adjustment support server 21 receives the Dpi values (S76).

The setting information HS changes the font size of the client based on the set minimum Dpi value and maximum Dpi value (S77). The Dpi values and the font size are temporarily stored in a temporary region of a memory (S78).

Next, the setting information HA compares the screen ratios (with regards to FIG. 9, [4:3] and [16:9] of "MIN/MAX Display resolution" in the [Hardware Display Property]) based on the information received at S65.

If the screen ratios are the same at S81, the setting information HA compares the resolutions ("MIN/MAX Display resolution" in the [Hardware Display Property]) (S90).

If the resolution in the shared format file is higher than the resolution of the display destination at S90, the resolution of the display destination is set (S91).

If the resolution of the display destination is higher than the resolution in the shared format file at S90, the resolution of the display destination is set to the resolution in the shared format file (S91). Subsequently, the process proceeds to the process at S121 in FIG. 11I.

If the screen ratios differ at S81, the setting information HA compared the horizontal dot widths (with regards to FIG. 9, [600] or [1600] of "MIN/MAX Display resolution" in the [Hardware Display Property]) (S82).

If the width of the display destination is wider than the setting value in the shared format file at S82, the horizontal width is expanded to the dot width of the display destination (S83).

If the width of the display destination is narrower than the setting value in the shared format file at S82, the horizontal width becomes the dot width of the display destination (S84).

Then, the setting information HA records the change quantity (%) of the horizontal dot width based on the setting value in the shared format file (S85). In other words, the value of [(horizontal dot width of display destination-setting value in shared format file)/setting value in shared format file] is recorded.

Next, the setting information HA compares the vertical dot width of the display destination (with regards to FIG. 9, [400] or [900] of the [MIN/MAX Display resolution] in the {Hardware Display Property}) based on the information received at S65 (S86).

If the vertical dot width of the display destination is wider than the setting value in the shared format file at S86, the vertical dot width is extended to the dot width of the display destination (S87).

If the vertical dot width of the display destination is narrower than the setting value in the shared format file at S86, the vertical dot width becomes the dot width of the display destination (S88).

Then, the setting information HA records the change quantity (%) of the vertical dot width based on the setting value in the shared format file (S89). In other words, the value of [(vertical dot width of display destination-setting value in shared format file)/setting value in shared format file] is recorded.

Next, the setting information HA compares the change quantity (minus end (%)) of the vertical dot width recorded at S85 and the setting value ("DPI Threshold of side (Minus)" in the [GUI Setting]) of the shared format file (S1O1).

If the change quantity is out of the setting value range in the shared format file (for example, exceeds 75%) at S101, the setting information HA displays a dialog screen to determine whether to adapt the horizontal dot width setting on the client's display (S102).

On the dialog screen, a "y" button can be depresses to adapt and a "N" button can be depresses to cancel the adaptation. When the "y" button is depressed (S103), the setting information HA proceeds to the process at S111 in FIG. 11H. When the "N" button is depressed (S105), the setting information HA leaves the display destination setting at default (S104) and proceeds to the process at S111 in FIG. 11H.

If the change quantity is within the setting value range in the shared format file (for example, 75% and below) at S101, the horizontal dot width's change quantity recorded at S85 is transmitted to the IF adjustment server 21 (S105). The IF adjustment server 21 receives the change quantity (S106) and stores the change quantity in the UI difference storage table (for device used) 34 as the difference information. Then, the process proceeds to the process at S111 in FIG. 11H.

Next, the setting information HA compares the change quantity of the vertical dot width (minus end (%)) recorded at S89 and the setting value ("DPI Threshold of length (Minus)" in the [GUI Setting]) in the shared format file (S111).

If the change quantity is out of the setting value range in the shared format file (for example, exceeds 75%) at S101, the setting information HA displays a dialog screen for determining whether to adapt the vertical dot width setting on the display of the client (S112).

On the dialog screen, the "y" button can be depressed to adapt and the "N" button can be depressed to cancel. When the "y" button is depressed (S113), the setting information HA proceeds to the process at S121 in FIG. 11I. When the "N" button is depressed (S113), the setting information HA displays whether to perform readjustments on the dialog screen (S114).

On the dialog screen, the "y" button can be depressed to adapt and the "N" button can be depressed to cancel. When the "y" button is depressed (S11S), the setting information HA proceeds to the process at S22 in FIG. 11A. When the "N" button is depressed (S115), the setting information HA leaves the display destination setting at default (S116).

If the change quantity is within the setting value range in the shared format file (for example, 75% and below) at S111, the change quantity (minus end (%)) of the vertical dot width recorded at S89 is transmitted to the IF adjustment server 21 (S117). The IF adjustment server 21 receives the change quantity (S118) and stores the change quantity in the UI difference storage table (for device used) 34 as the difference information. Then, the process proceeds to the process at S121 in FIG. 11I.

In the present embodiment, due to explanatory reasons, only the "DPI Threshold of side (Minus Percent)" and the "DPI Threshold of length (Minus Percent)" are explained in detail. However, comparisons are also performed on "DPI Threshold of side (Plus Percent)", "DPI Threshold of length (Plus Percent)", and other items, as well.

Next, the setting HA judges whether there are other items that need to be changed based on the information received at S65 (S121).

If it is judged that another item needs to be changed at S121, the setting information HA sets the item in the shared format file (S122). Then, the setting information HA displays the dialog screen to determine whether the item's setting is adapted in the client's display (S123).

On the dialog screen, the "y" button can be depressed to adapt and the "N" button can be depressed to cancel. When the "y" button is depressed (S124), the setting information HA proceeds to the process at S121. When the "N" button is depressed (S124), the setting information HA displays whether to perform readjustment on the dialog screen (S125).

On the dialog screen, the "y" button can be depressed to adapt and the "N" button can be depressed to cancel. When the "y" button is depressed (S126), the setting information HA proceeds to the process at S22 in FIG. 11A. When the "N" button is depressed (S126), the setting information HA leaves the display destination setting at default (S127) and proceeds to the process at S121.

If it is judged that there are no items to be changed at S121, the adaptation result is transmitted to the IF adjustment support server 21 in the shared format file (S128). The IF adjustment support server 21 receives the shared format file of the adaptation result (S129) and stores the adaptation result in the UI difference storage table (for device used) 34. Then, the client displays the screen in the GUI environment according to the result adapted thus far by the setting information HA (S130).

Figure 12:
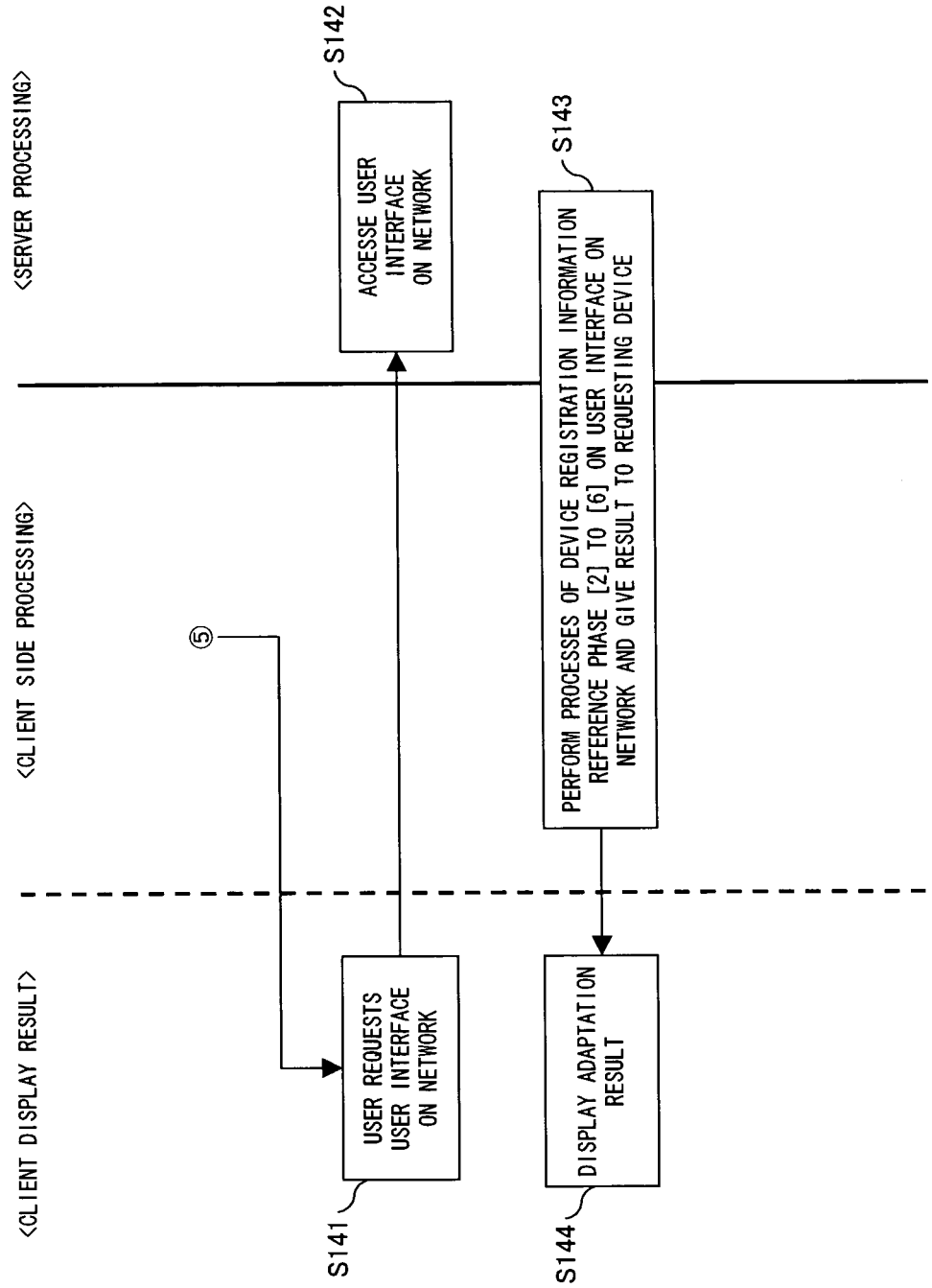
FIG. 12 is a diagram showing a process flow of a <network IF reference phase> according to the present embodiment.

FIG. 12 shows a process flow of <network IF reference phase> in the present embodiment. FIG. 12 is a flow that is performed when the process proceeds to (S53) when the display subject in FIG. 11C is different from the client's GUI.

First, the user requests a user interface on the network (S141). Here, the client-end accesses an arbitrary content server or the like on the network via the IF adjustment support server 21 (S142).

The arbitrary content server provides content (interface) to the client according to the access. At this time, the IF adjustment support server 21 receives the content (interface). The IF adjustment support server 21 performs the processes in FIGS. 11C to FIG. 11I on the content (interface) information and provides the information to the client (S143) Then, the client displays the screen in the GUI environment according to the result adapted thus far by the setting information HA (S144).

As a result, the standard device's user interface environment can be adapted to the device used, not only when the user interface present with in the device used is referenced, but also when the user interface on the network is referenced.

FIG. 13 shows a process flow of the <completion phase> in the present embodiment. FIG. 13 is a flow performed when log-in to the IF adjustment support system 20 is not performed at S28 in FIG. 11A.

First, the setting information HA reads the client interface and the client's setting information (S151). Next, the GUI and the setting information currently displayed in the client computer are read (S152).

The setting information HA determines if the information read at S151 and the information read at S152 match (S153) . If they are judged to match, the process proceeds to S27 in FIG. 11A. If they are judged not to match, the setting information HA deletes the interface and the setting information currently displayed in the client (S154).

Then, the default information of the interface of the initial setting stored temporarily in the client computer at S24 in FIG. 11A is adapted to the client (S155) . In addition, the setting information of the interface of the standard device before environment adaptation stored temporarily in the client computer at S24 in FIG. 11A is adapted to the client (S155).

Therefore, the optimum display setting information is deleted when the log-in into the system is terminated or when a forced shut-down occurs due to a communication error, such as network disconnection. The termination causes the device's interface environment used prior to the adaptation to be quickly reconstructed. Thus, the protection of personal information can be ensured.

Figure 14:
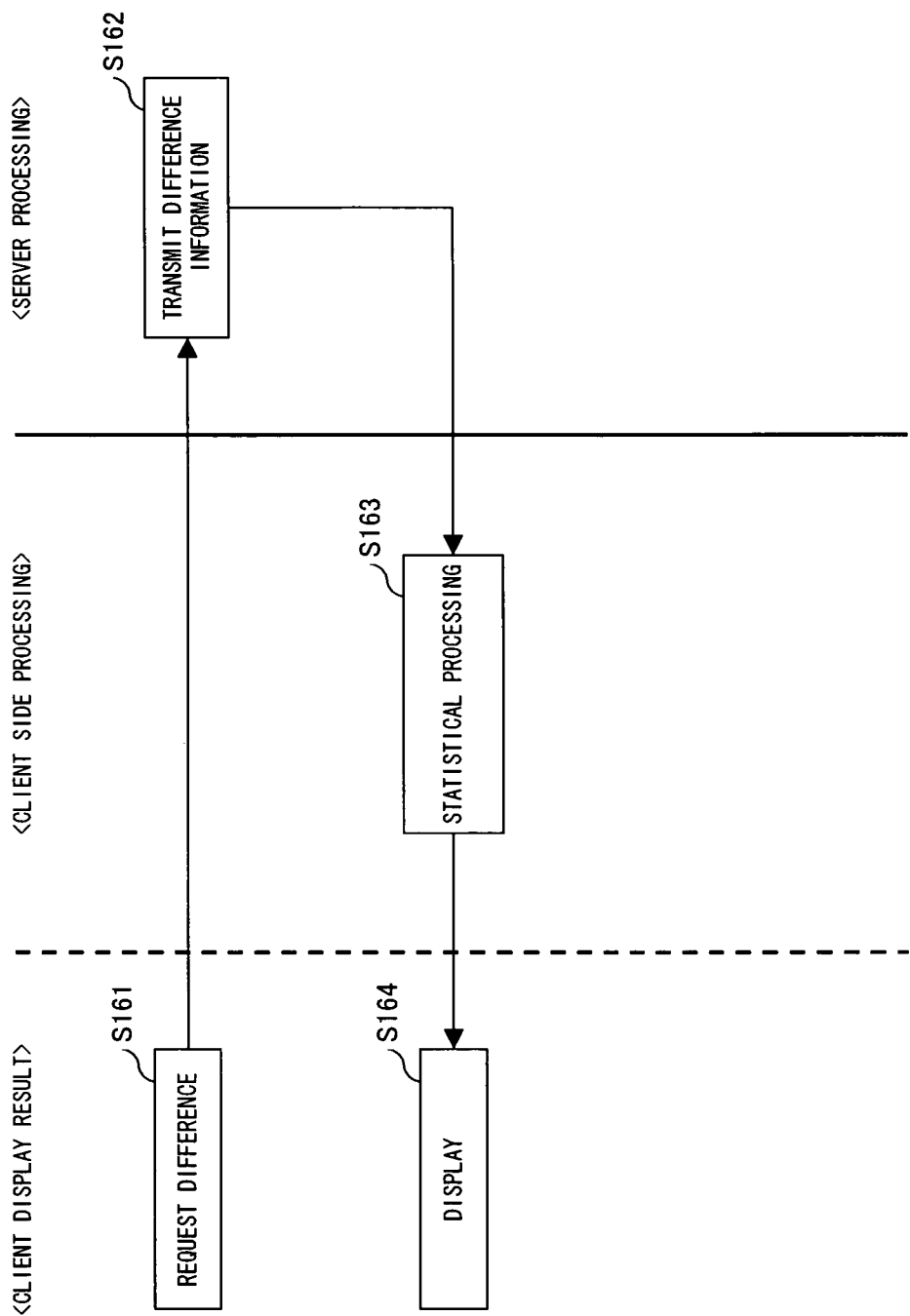
FIG. 14 is a diagram showing a process flow of a <difference information provision phase> according to the present embodiment.

FIG. 14 shows the <difference information provision phase> in the present embodiment. First, a request for difference information is transmitted from the product creator terminal 24 to the IF adjustment support server 21 (S161).

The IF adjustment support server 21 extracts the difference information from the UI difference storage table 34 in the database and transmits the difference information to the client (S162). The client-end that acquires the difference information performs calculations on the quantified difference information using a statistical method (S163). The statistical method tabulates, for example, the difference information of the subject user group and the interface group, and calculations of average, standard deviation, normal distribution, dispersion, maximum frequency, and the like are performed. The statistical method is not limited thereto and includes all known methods.

The statistical result is visualized through a graph or the like and is displayed on the display screen in the client computer (S164).

Figure 15:
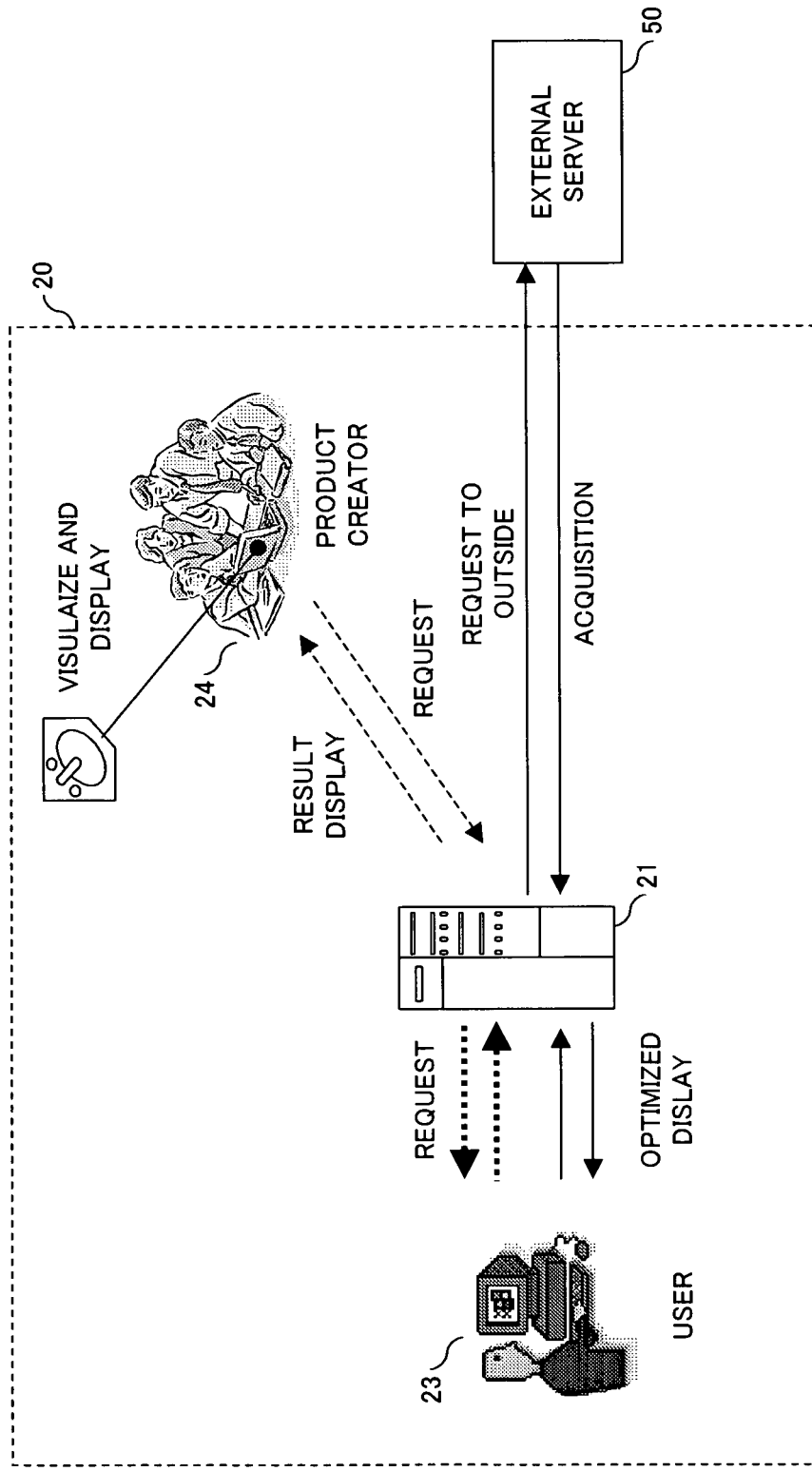
FIG. 15 is a diagram showing an example of when an interface on a network is referenced via the IF adjustment support system 20.

FIG. 15 shows an example of the present embodiment. The diagram shows when the interface on the network is referenced via the IF adjustment support system 20. First, the user accesses an external server 50 on the network via the IF adjustment support server 21 to reference the interface on the network using the device used 23 as is conventionally done. Then, the IF adjustment support server 21 acquires the interface from the external server 50.

The IF adjustment support server 21 optimizes the acquired interface for the size specified by the device used 23 and then transmits the interface to the device used 23. The IF adjustment support server 21 records the difference information during the optimization to the database.

The device used 23 displays the optimized interface. Whenever the user accesses a new interface on the network using the device used 23, the IF adjustment support server 21 performs both the above-described optimization process and the difference information accumulation.

Through references to the difference information, the product creator can create a more suitable interface when they create a new interface.

The processes on the client-end and the processes on the server side, described above, are not limited to the contents described in the present embodiment. If possible, the processes on the client-end in the present embodiment can be performed on the server side and the processes on the server-end in the present embodiment can be performed on the client side.

Figure 16:
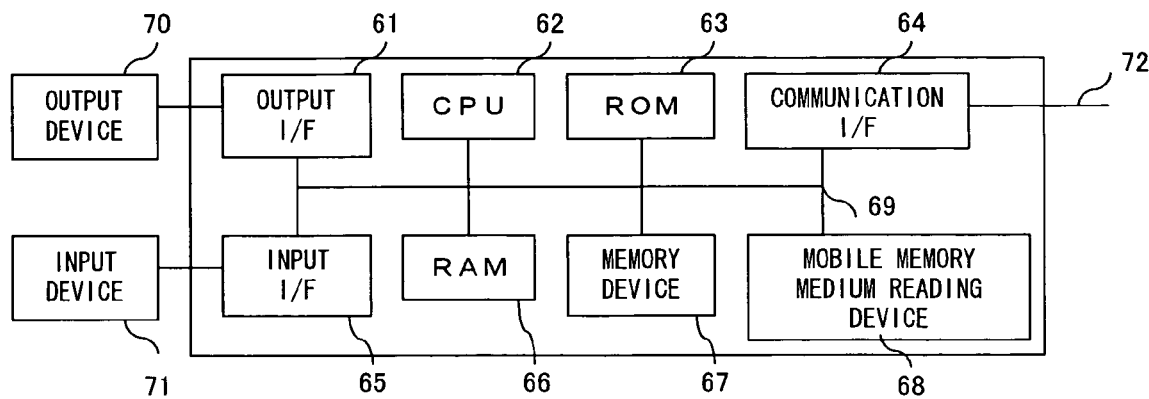
FIG. 16 is a configuration block diagram of a hardware environment of a client or a server according to the present embodiment.

FIG. 16 is a configuration block diagram of a hardware environment of the client or the server in the present embodiment. In the diagram, the client is composed of a central processing unit (CPU) 62, a read only memory (ROM) 63, a random access memory (RAM), a communication interface (interface is hereinafter referred to as I/F) 64, a memory device 67, an output I/F 61, an input I/F 65, a mobile memory medium reading device 68, a bus 69 to which all of the above are connected, an output device 70 connected to the output I/F 61, and an input device 71 connected to the input I/F 65.

Various types of memory devices, such as a hard disk or a magnetic disk, can be used as the memory device 67. Programs for the flows used in the present embodiment, described above, are stored in the memory device 67, such as the above, or the ROM 63. In addition, in the case of the client, the memory device 67 stores the shared format file of the client's default interface setting, the shared format file of the interface setting after customization, and the like.

The programs according to the present embodiment can be stored in, for example, the memory device 67 from a program provider-end via a network 72 or the communication I/F 64. In addition, the programs can be commercially available, stored in a distributed mobile memory medium, set in the reading device 68, and run by the CPU 62. Various types of memory mediums, such as a compact disc-read only memory (CD-ROM), a flexible disk, an optical disk, a magneto-optical disk, and an IC card, can be used as the mobile memory medium. The program stored in the memory medium, such as the above, is read by the reading device 68.

In addition, a keyboard, a mouse, a digital camera, a microphone, a scanner, a sensor, a tablet, and the like can be used as the input device 71. In addition, a display, a printer, a speaker, and the like can be used as the output device 70. In addition, the network 72 can be the internet, a local area network (LAN), a wide area network (WAN), a communication network that is a dedicated line, wired, wireless, and the like.

Therefore, with regards to the user interface of a device, in the past when there were plural devices used, the user had to perform adjustments to the user interface environment every time a different device was used. Thus, it was difficult to consistently obtain a constant effect.

However, through the use of the present system, the display setting of the standard device's user interface can be transferred to another device (device used), and thus, constant operation can be expected regardless of the device used.

In other words, the present system is implemented regardless of the type of device and corresponds to various authentication methods. As a result, if the user can be uniquely identified, the operation of the user interface used on a personal computer in the home and the effect of the interface can be reproduced in a bank cash dispenser, a railroad ticket vending machine, and the like.

In other words, user interfaces suited for individual users can be adapted to user interfaces dispersed over the network. Therefore, barriers of the devices can be kept low, the advancement to a barrier-free environment can be facilitated, and environments optimized to individual users can be provided.

In addition, in the past, information on the user interface contributed only to the optimization of the device's display. However, in the present system, a statistical calculation is performed on the difference information of the interface setting accumulated during optimization. The result of the calculation can be visualized and presented in a graph or the like. As a result, these calculations facilitate the understanding of the interface's weaknesses and suggest possible improvements. Therefore, preference research, such as man-hour, time, the burden of testing placed on the product creator, equalization of operability, color trends, and the like, is facilitated.

According to the present invention, when the user customizes the display aspects to improve usability, using the user interface of a device with arbitrary adjustments, setting information of the display aspect, and software and plug-ins for function enhancement can be registered onto the network.

Therefore, a barrier-free environment can be actualized, regardless of the location or device, towards a ubiquitous society. In addition, when a display setting unique to the client is used, the network interface can maintain a display layout that does not depart from the intentions of the product creator.

The present invention is not limited to the embodiments described above and can take on various aspects and embodiments without departing from the principles of the invention.

By implementing the present invention, an interface creating little discomfort can be actualized, regardless of the existence of a network. In addition, an environment without destroying little layout of the interface present on the network can be actualized.

In addition, differences in displays between a pre-existing interface and the user performing access are accumulated, and the accumulated information can be provided to the product creator to optimize the interface.

What is claimed is:

1. An interface adjustment support system that adjusts a display environment of a user interface of a first display device to adapt to a second display device, comprising:
   a judgment unit that judges whether a display device used by a user is the first display device or the second display device;
   a first display environment setting information input unit to which first display environment setting information of the user interface of the first display device, is input when the judgment unit judges that the display device used by the user is the first display device;
   a first display environment setting information storage unit that stores the first display environment setting information; and
   a display adapting unit that adapts the display environment of the first display device to the second display device using the first display environment setting information when the judgment unit judges that the display device used by the user is the second display device, wherein the display adapting unit comprises:
   a second display environment setting information acquiring unit that acquires second display environment setting information of a default user interface according to a specification of the second display device;

a comparing unit that compares the first display environment setting information with the second display environment setting information when the judgment unit judges that a display device used by the user is the second display device;

an optimizing unit that generates optimum display environment setting information by optimizing the first display environment setting information within a range of the specification of the second display device using the second display environment setting information using a comparison result from the comparing unit; and an optimum display adapting unit that adapts the optimum display environment setting information to the second display device to display the user interface of the first display device within the range of the specification of the second display device on the second display device, wherein the optimizing unit, as the comparison result, sets a standard setting of the second display device in a setting item in the optimum display environment setting information when a setting item corresponding to a setting item in the second display environment setting information is not present in the first display environment setting information, and sets a setting value of the setting item of the second display environment setting information or a setting value of a corresponding setting item of the first display environment setting information in the optimum display environment setting information depending on which of the setting values is larger or smaller.

2. The interface adjustment support system according to claim 1, wherein:

the optimizing unit acquires change quantity of the optimum setting information, using the first display environment setting information, as difference information.

3. The interface adjustment support system according to claim 2, further comprising:

a difference information storage unit that stores the difference information acquired by the optimizing unit.

4. The interface adjustment support system according to claim 3, further comprising:

a difference information providing unit that provides the difference information stored in the difference information storage unit.

5. The interface adjustment support system according to claim 4, wherein:

the difference information providing unit performs a statistical processing on the difference information and visualizes and presents the difference information.

6. The interface adjustment system according to claim 1, wherein:

the display adapting unit further comprises:

a reconstruction unit that deletes adapted optimum display information and reconstructs the user interface environment of the second display device to the user interface environment before adaptation, when the interface adjustment support system is completed after the optimum display environment setting information is adapted to the second display device by the optimum display adapting unit.

7. The interface adjustment support system according to claim 1, wherein:

the display adapting unit adapts the optimum display environment setting information to the second display device when a user interface present within the second display device is referenced or when a user interface present on a network is referenced.

8. The interface adjustment support system according to claim 1, wherein the judgment unit judges whether the display device used by the user is the second display device when the first display environment setting information does not exist.

9. An information processing device comprising:

a judgment unit that judges whether a display device used by a user is a first display device or a second display device;

a receiving unit that receives first display environment setting information of a user interface of the first display device from an interface adjustment support management device when the display device used by a user is the second display device; and a display adapting unit that adapts a display environment using the first display environment setting information, wherein the display adapting unit comprises:

a default information acquiring unit that acquires second display environment setting information of a default user interface according to a specification of the information processing device;

a comparing unit that compares the first display environment setting information with the second display environment setting information when the judgment unit judges that the display device used by the user is the second display device;

an optimizing unit that generates optimum display environment setting information by optimizing the first display environment setting information within a range of the specification of the information processing device using the second display environment setting information using a comparison result from the comparing unit; and an optimum display adapting unit that adapts the optimum display environment setting information to the information processing device to display the user interface of the standard device within the range of the specification of the information processing device on the information processing device, wherein the optimizing unit, as the comparison result, sets a standard setting of the second display device in a setting item in the optimum display environment setting information when a setting item corresponding to a setting item in the second display environment setting information is not present in the first display environment setting information, and sets a setting value of the setting item of the second display environment setting information or a setting value of a corresponding setting item of the first display environment setting information in the optimum display environment setting information depending on which of the setting values is larger or smaller.

10. The information processing device according to claim 9, wherein:

the display adapting unit further comprises:

a current information acquiring unit that acquires current display environment setting information of a current user interface on the information processing device before the optimum display environment setting information is adapted by the optimum display adapting unit; and a reconstruction unit that deletes the optimum display environment information and reconstructs the user interface environment before the optimum display environment setting information adaptation using the current display environment setting information stored in advance, when communication with the interface adjustment support management device is completed after the optimum display environment setting information is adapted by the optimum display adapting unit.

11. The information processing device according to claim 9, wherein
the judgment unit judges whether the display device used by the user is the second display device when the first display environment setting information does not exist.

12. A computer-readable storage medium, comprising:
a judging process for judging whether a display device used by a user is a first display device or a second display device;
a receiving process for receiving first display environment setting information of a user interface of the first display device from an interface adjustment support management device when the display device used by the user is the second display device; and
a display adapting process for adapting a display environment using the first display environment setting information, wherein
the display adapting process comprises:
a default information acquiring process for acquiring second display environment setting information of a default user interface according to a specification of the information processing device;
a comparison process for comparing the first display environment setting information with the second display environment setting information when the judgment unit judges that the display device used by the user is the second display device;
an optimizing process for generating optimum display environment setting information by optimizing the first display environment setting information within a range of the specification of the information processing device using the second display environment setting information using a comparison result of the comparing process; and
an optimum display adapting process for adapting the optimum display environment setting information to the information processing device to display the user interface of the standard device within the range of the specification of the information processing device on the information processing device, wherein
the optimizing process, as the comparison result, sets a standard setting of the second display device in a setting item in the optimum display environment setting information when a setting item corresponding to a setting item in the second display environment setting information is not present in the first display environment setting information, and sets a setting value of the setting item of the second display environment setting information or a setting value of a corresponding setting item of the first display environment setting information in the optimum display environment setting information depending on which of the setting values is larger or smaller.

13. The storage medium according to claim 12, wherein:
the display adapting process further comprises:
a reconstruction process for deleting the optimum display information and reconstructing the user interface environment before optimum display environment setting information adaptation, using the current optimum display environment setting information stored in advance, when communication with the interface adjustment support management device is completed after the optimum display environment setting information is adapted by the optimum display adapting process.

14. The storage medium according to claim 12, wherein
the judging process judges whether the display device used by the user is the second display device when the first display environment setting information does not exist.

15. An interface adjustment support management device that adjusts a display environment of a first display device's user interface to adapt to a second display device, comprising:
a receiving unit that receives first display environment setting information of a user interface of the first display device;
a first display environment setting information storage unit that stores first display environment setting information of the user interface of the first display device; and
a difference information storage unit that stores quantity of change in optimum display environment setting information from the first display environment setting information as difference information, the optimum display environment setting information being generated by optimizing the first display environment setting information within a range of a specification of the second display device using a second display environment setting information using a comparison result obtained by comparing a setting item in the second display environment setting information of a default user interface of the second display device with a corresponding setting item in the first display environment setting information, and the optimum display environment setting information being used for displaying the user interface of the first display device within the range of the specification of the second display device on the second display device;
wherein when a setting item corresponding to a setting item in the second display environment setting information is not present in the first display environment setting information, a standard setting of the second display device is set as the corresponding setting item in the optimum display environment setting information, and
wherein a setting value of the setting item of the second display environment setting of the second display environment setting information or a setting value of a corresponding setting item of the first display environment setting information is set in the optimum display environment setting information depending on which of the setting values is larger or smaller.

16. The interface adjustment support management device according to claim 15, further comprising:
a difference information providing unit that provides the difference information stored in the difference information storage unit.

17. The interface adjustment support management device according to claim 16, wherein:
the difference information providing unit performs statistical processing on the difference information and visualizes and presents the difference information.

18. The interface adjustment support management device according to claim 15, further comprising:
a display adapting unit that adapts a first display device's display environment to the second display device using the first display environment setting information;
wherein, the display adapting unit comprises:
a second display environment setting information acquiring unit that acquires the second display environment setting information of a default user interface according to a specification of the second display device;

a comparison unit that compares the first display environment setting information with the second display environment setting information;

an optimizing unit that generates optimum display environment setting information by optimizing the first display environment setting information within a range of the specification of the second display device using the second display environment setting information using a comparison result from the comparing unit; and an optimum display adapting unit that adapts the optimum display environment setting information acquired by the optimizing unit to the second display device;

wherein, the display adapting unit adapts the optimum display environment setting information to the second display device when there is a request to reference a user interface present on a network from the second display device, and displays the user interface of the first display device within the range of the specification of the second display device on the second display device.

19. A computer-readable storage medium storing an interface adjustment support management program allowing the computer to execute a process that adjusts a display environment of a first display device's user interface to adapt to a second display device, comprising:

a receiving process that receives first display environment setting information of a user interface of the first display device;

a first device display storage process that stores first display environment setting information of the user interface of the first display device; and a difference information storage process that stores quantity of change in optimum display environment setting information from the first display environment setting information as difference information in a storage unit, the optimum display environment setting information being generated by optimizing the first display environment setting information within a range of a specification of the second display device using a second display environment setting information using a comparison result obtained by comparing a setting item in the second display environment setting information of a default user interface of the second display device with a corresponding setting item in the first display environment setting information, and the optimum display environment setting information being used for displaying the user interface of the first display device within the range of the specification of the second display device on the second display device;

wherein when a setting item corresponding to a setting item in the second display environment setting information is not present in the first display environment setting information, a standard setting of the second display device is set as the corresponding setting item in the optimum display environment setting information, and wherein a setting value of the setting item of the second display environment setting of the second display environment setting information or a setting value of a corresponding setting item of the first display environment setting information is set in the optimum display environment setting information depending on which of the setting values is larger or smaller.

20. The storage medium according to claim 19 further comprising a difference information providing process that provides the difference information stored in the storage unit.

* * * * *